United States Patent
Johnsson et al.

(10) Patent No.: US 11,582,111 B2
(45) Date of Patent: Feb. 14, 2023

(54) MASTER NODE, A LOCAL NODE AND RESPECTIVE METHODS PERFORMED THEREBY FOR PREDICTING ONE OR MORE METRICS ASSOCIATED WITH A COMMUNICATION NETWORK

(71) Applicant: TELEFONAKTIEBOLAGET LM ERICSSON (PUBL), Stockholm (SE)

(72) Inventors: Andreas Johnsson, Uppsala (SE); Christofer Flinta, Stockholm (SE); Jawwad Ahmed, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 578 days.

(21) Appl. No.: 16/349,659

(22) PCT Filed: Nov. 29, 2016

(86) PCT No.: PCT/SE2016/051183
§ 371 (c)(1),
(2) Date: May 14, 2019

(87) PCT Pub. No.: WO2018/101862
PCT Pub. Date: Jun. 7, 2018

(65) Prior Publication Data
US 2019/0349266 A1    Nov. 14, 2019

(51) Int. Cl.
*H04L 41/147* (2022.01)
*G06N 20/00* (2019.01)
(Continued)

(52) U.S. Cl.
CPC ........... *H04L 41/147* (2013.01); *G06N 20/00* (2019.01); *H04L 41/0893* (2013.01); *H04L 41/145* (2013.01); *H04L 67/10* (2013.01)

(58) Field of Classification Search
USPC ........................................................ 709/224
See application file for complete search history.

(56) References Cited

U.S. PATENT DOCUMENTS

| | | | |
|---|---|---|---|
| 9,491,060 B1 | 11/2016 | Bernardo de Oliveira et al. | |
| 2015/0332165 A1* | 11/2015 | Mermoud | H04L 41/147 706/12 |
| 2015/0381648 A1* | 12/2015 | Mathis | H04L 41/145 726/22 |

OTHER PUBLICATIONS

Ahmed, J., et al.; "Predicting SLA Conformance for Cluster-Based Services Using Distributed Analytics"; NOMS 2016—2016 IEEE/IFIP Network Operations and Management Symposium; Apr. 25-29, 2016; pp. 848-852.

(Continued)

*Primary Examiner* — Hermon Asres
(74) *Attorney, Agent, or Firm* — Patent Portfolio Builders PLLC

(57) ABSTRACT

A master node, a local node, a service assurance system, and a respective method performed thereby for predicting one or more metrics associated with a communication network are provided. The method performed by the master node operable in the communication network comprises receiving prediction(s) based on training data from local nodes in the communication network; and determining weight parameter(s) associated with the local nodes based on the current received prediction(s) and past received predictions. The method further comprises adjusting a respective local reporting policy for one or more local nodes based on the determined weight parameter(s).

14 Claims, 16 Drawing Sheets

(51) Int. Cl.
　　　H04L 41/0893　(2022.01)
　　　H04L 41/14　(2022.01)
　　　H04L 67/10　(2022.01)

(56) References Cited

OTHER PUBLICATIONS

Blum, A.; "On-Line Algorithms in Machine Learning" Published in: Developments from a Jun. 1996 seminar on Online algorithms: the state of the art; Chapter 14; Jan. 1998, pp. 306-325.

Hastie, et al.; "The Elements of Statistical Learning, Data Mining, Inference, and Prediction", Second Edition, Corrected 12th printing, Jan. 13, 2017; pp. 9-11.

Hastie, et al.; "The Elements of Statistical Learning, Data Mining, Inference, and Prediction", Second Edition, Corrected 12th printing, Jan. 13, 2017; pp. 119-127.

Hastie, et al.; "The Elements of Statistical Learning, Data Mining, Inference, and Prediction", Second Edition, Corrected 12th printing, Jan. 13, 2017; pp. 305-313.

Hastie, et al.; "The Elements of Statistical Learning, Data Mining, Inference, and Prediction", Second Edition, Corrected 12th printing, Jan. 13, 2017; pp. 587-596.

Sharma, et al.; "CloudPD: Problem Determination and Diagnosis in Shared Dynamic Clouds"; IEEE Explore, 2013 43rd Annual IEEE/IFIP International Conference on Dependable Systems and Networks (DSN); Jun. 24-27, 2013; 12 pages.

Song, H. H., et al.; "Q-score: Proactive Service Quality Assessment in a Large IPTV System"; Internet Measurement Conference 2011; Nov. 2-4; 14 pages; Berlin, Germany.

Yanggratoke, R., et al.; "Predicting service metrics for cluster-based services using real-time analytics"; IFIP/IEEE 11th International Conference on Network and Service Management, CNSM, Aug. 28, 2015; 9 pp. 1-9.

Communication pursuant to Article 94(3) EPC in corresponding/related European Application No. 16 816 000.0-1215 dated Feb. 17, 2021.

Gabriel Martins Dias et al., "A Survey about Prediction-based Data Reduction in Wireless Sensor Networks", ACM Computing Surveys, Jul. 12, 2016, pp. A1-A37.

Hongbo Jiang et al., "Prediction or Not? An Energy-Efficient Framework for Clustering-Based Data Collection in Wireless Sensor Networks", IEEE Transactions on Parallel and Distributed Systems, Jun. 2011, pp. 1064-1071, vol. 22, No. 6.

International Search Report and Written Opinion, dated Aug. 11, 2017, from corresponding International Application No. PCT/SE2016/051183.

Rerngvit Yanggratoke et al., "Predicting Real-time Service-level Metrics from Device Statistics," 2015, IFIP/EEE International Symposium on Integrated Network Management (IM2015), pp. 414-422.

* cited by examiner

Networked FS = Gluster FS; Transcoding instance = ffmpeg; HTTP Load Balancer = HA Proxy; Web server = Apache 2

| Node | Weight |
|---|---|
| M1: | $9.881006\text{E}{-}02$ |
| M2: | $1.349063\text{E}{-}02$ |
| M3: | $3.860332\text{E}{+}02$ |
| M4: | $3.219122\text{E}{+}08$ |
| M5: | $4.477032\text{E}{+}08$ |
| M6: | $1.271015\text{E}{-}01$ |

Fig. 4k

MASTER NODE, A LOCAL NODE AND RESPECTIVE METHODS PERFORMED THEREBY FOR PREDICTING ONE OR MORE METRICS ASSOCIATED WITH A COMMUNICATION NETWORK

TECHNICAL FIELD

The present disclosure relates to communication networks and in particular to predicting one or more metrics associated with the communication network.

BACKGROUND

Some future telecom services will execute in a telecom cloud environment, which combine the flexibility of today's computing clouds with the service quality of telecom systems. Real-time service assurance will become an integral part in transforming the general purpose cloud into a robust and highly available cloud that can ensure low latency and agreed service quality for its customers.

A service assurance system for telecom services must be able to detect or predict problems that may violate the agreed service quality. This is a complex task already in legacy systems and will become even more challenging in the cloud particularly for the services which are distributed on multiple machines in the same datacentre or even across multiple geographically dispersed datacentres. Furthermore, the service assurance system must be able to remedy, in real time, these problems once detected. One promising approach to service assurance is based on machine learning, where the service quality and behaviour is learned from observations of the system. The ambition is to do automated real-time predictions of the service quality in order to execute mitigation actions in a proactive manner.

Machine learning has been used in the past to build prediction models for service quality assurance. For example, predicting user application quality-of-service, QoS, parameters, quality-of-experience, QoE, and anomalies for complex telecom environments. The key idea is to use sample data for training a statistical model, which is then used for predictions of unseen data. However, machine learning based service quality prediction techniques can be computationally intensive particularly for the complex distributed services which are themselves relaying on many base component services to compose a high level service which is then provided to its end users spread around on multiple machines in server cluster(s). A major challenge is to handle huge amounts of high velocity data (e.g., monitoring, preprocessing, and analysis) being generated by the devices involved in the service graph in a scalable manner by avoiding the computational and network bottlenecks. Such scenarios necessitate the design of a distributed learning system following the in-network analytics philosophy where the computational tasks are performed as close as possible to the data sources.

Machine learning refers to the task of predicting unseen information based on the currently available examples using statistical learning techniques. Predictions can broadly be categorised into a classification problem or regression problem. Suitable models for predictions should exhibit low latency and overhead, and preferably also be interpretable (white box solution).

Logistic regression is a common method for solving classification problems. It specifies the log-odds posterior probability for the classes and takes positive or negative real numbers as input, while output values are either zero or one. It can hence be interpreted as the posterior probability of drawing a sample from the respective class.

Another family of classifiers is decision trees, where the feature space is split into a set of regions based on one or more homogeneity criteria recursively until there is no more significant gain in terms of homogeneity of the members of each class. The benefit of decision trees over linear methods is that they perform well even when the inherent relationship between the predictors and the response variable is non-linear. And non-parametric property means that no assumptions are made on the form or shape of the true underlying function. The cost of making a decision is dependent on the height of the tree which is logarithmic in the size of tree.

Decision trees are flexible and have low bias but may lead to high variance in predictions in many cases. However, studies have shown that their effectiveness can be significantly increased when used as a base component for the ensembles such as bagging or random forest.

Distributed machine learning refers to methods where the feature space or the sample space is distributed for computation among several nodes. Local models are trained for each data set and then the prediction is made by fusing the results of the local models. One of the classical methods is the Winnow algorithm where in simple terms each local model transmits a vote (i.e. a classification) to a central agent. This agent performs a weighted majority calculation for the final prediction.

Distributed machine learning methods has several advantages over the more traditional centralised methods like scalability, reduced network control overhead, resilience to failures and data privacy.

However, it is challenging to deploy such algorithms in distributed resource constrained environments (e.g. low battery, computation power, memory and transmission capacity) for example in sensor networks. This is also the case in Radio Access Networks, RANs, providing a cellular service (e.g. 4G/LTE, i.e. Long Term Evolution) to the customers where limited resources are available at local mobile nodes and they may operate on battery or solar energy. Main limitation here is that many distributed learning algorithm components executing on local nodes can put significant computation strain during model building and update phases as well as during data transmission. In such scenarios it can be greatly beneficial to in some way reduce the resource overhead and optimise the resource consumption of the distributed learning algorithms. Optimising the resource usage will allow deploying and reaping the key benefits of distributed learning in resource constrained environments where traditionally it may not have been possible to do this before like edge-computing devices in internet of Things, IoT, sensor networks and RAN in a LTE network scenario.

SUMMARY

The object is to obviate at least some of the problems outlined above. In particular, it is an object to provide a master node, a local node, a service assurance system and respective methods performed thereby for predicting one or more metrics associated with a communication network are provided. These objects and others may be obtained by providing a master node, a local node, and a service assurance system and a method performed by a master node, a local node, and a service assurance system respectively according to the independent claims attached below.

According to an aspect, a method performed by a master node for predicting one or more metrics associated with a communication network is provided. The master node is operable in the communication network. The method comprises receiving prediction(s) based on training data from local nodes in the communication network; and determining weight parameter(s) associated with the local nodes based on the received prediction(s) and previously received predictions. The method further comprises adjusting a respective local reporting policy for one or more local nodes based on the determined weight parameter(s).

According to an aspect, a method performed by a local node for predicting one or more metrics associated with a communication network is provided. The local node is operable in the communication network. The method comprises receiving a local reporting policy from a master node in the communication network, the local reporting policy informing the local node of how to send a prediction to the master node. Based on the received local reporting policy from the master node, the method comprises building a local model based on locally available data; performing a prediction based on the local model; and transmitting the prediction to the master node in accordance with the received local reporting policy.

According to an aspect, a method performed by a service assurance system implemented in a communication network for predicting one or more metrics associated with the communication network. The service assurance system comprises the master node and one or more local nodes above. The method comprises the master node requesting a first set of predictions based on training data from the one or more local nodes in the communication network; and the one or more local nodes receiving the request, building a local model based on locally available data, performing a prediction and transmitting the prediction(s) to the master node. The method further comprises the master node receiving the prediction(s) from local nodes in the communication network, determining weight parameter(s) associated with the local nodes based on the received prediction(s) and previously received predictions, and adjusting a respective local reporting policy for one or more local nodes based on the determined weight parameter(s). The method also comprises the one or more local nodes receiving the local reporting policy from the master node in the communication network, the local reporting policy informing the local node of how to send prediction(s) to the master node. Based on the received reporting policy from the master node, the method comprises the one or more local nodes building a local model based on locally available data, performing a prediction based on the local model, and transmitting the prediction to the master node in accordance with the received local reporting policy.

According to an aspect, a master node for predicting one or more metrics associated with a communication network is provided. The master node is operable in the communication network. The master node is configured for receiving prediction(s) based on training data from local nodes in the communication network; and determining weight parameter(s) associated with the local nodes based on the received prediction(s) and previously received predictions. The master node is further configured for adjusting a respective local reporting policy for one or more local nodes based on the determined weight parameter(s).

According to an aspect, a local node for predicting one or more metrics associated with a communication network is provided. The local node is operable in the communication network. The local node is configured for receiving a local reporting policy from a master node in the communication network, the local reporting policy informing the local node of how to send a prediction to the master node. Based on the received local reporting policy from the master node, the local node is configured for building a local model based on locally available data; performing a prediction based on the local model; and transmitting the prediction to the master node in accordance with the received local reporting policy.

According to an aspect, a service assurance system implemented in a communication network for predicting one or more metrics associated with the communication network. The service assurance system comprises the master node and one or more local nodes above. The service assurance system is configured for the master node requesting a first set of predictions based on training data from the one or more local nodes in the communication network; and the one or more local nodes receiving the request, building a local model based on locally available data, performing a prediction and transmitting the prediction(s) to the master node. The service assurance system is configured for the master node receiving the prediction(s) from local nodes in the communication network, determining weight parameter(s) associated with the local nodes based on the received prediction(s) and previously received predictions, and adjusting a respective local reporting policy for one or more local nodes based on the determined weight parameter(s). The service assurance system is configured for the one or more local nodes receiving the local reporting policy from the master node in the communication network, the local reporting policy informing the local node of how to send prediction(s) to the master node. Based on the received reporting policy from the master node, the service assurance system is configured for the one or more local nodes building a local model based on locally available data, performing a prediction based on the local model, and transmitting the prediction to the master node in accordance with the received local reporting policy.

The master node, the local node, the service assurance system and the respective method performed thereby has several advantages. One possible advantage is that overall computation and data communication overhead may be reduced by processing predictions, e.g. OAM data, of the local nodes from which it originates. In case the local node may not be able to process data (i.e. low capacity local nodes), it is possible to process the data in close proximity by sharing data to close neighbouring local nodes. Another possible advantage is that it allows reducing the computation overhead on several of the (selected) local nodes by limiting their participation in distributed learning. Still a possible advantage is that it is possible to optionally reduce the frequency of predictions, or prediction cycle, of (selected) local nodes instead of completely deactivate a local node. Yet another possible advantage is that data transmission overhead induced by distributed learning may also be optimised by reducing the frequency and size of the training data transmitted from local nodes to the master node.

BRIEF DESCRIPTION OF DRAWINGS

Embodiments will now be described in more detail in relation to the accompanying drawings, in which:

FIG. 4k is a table of participating nodes in the distributed Machine Learning, ML, and their weights in the test-bed setup.

DETAILED DESCRIPTION

Figure 1A:
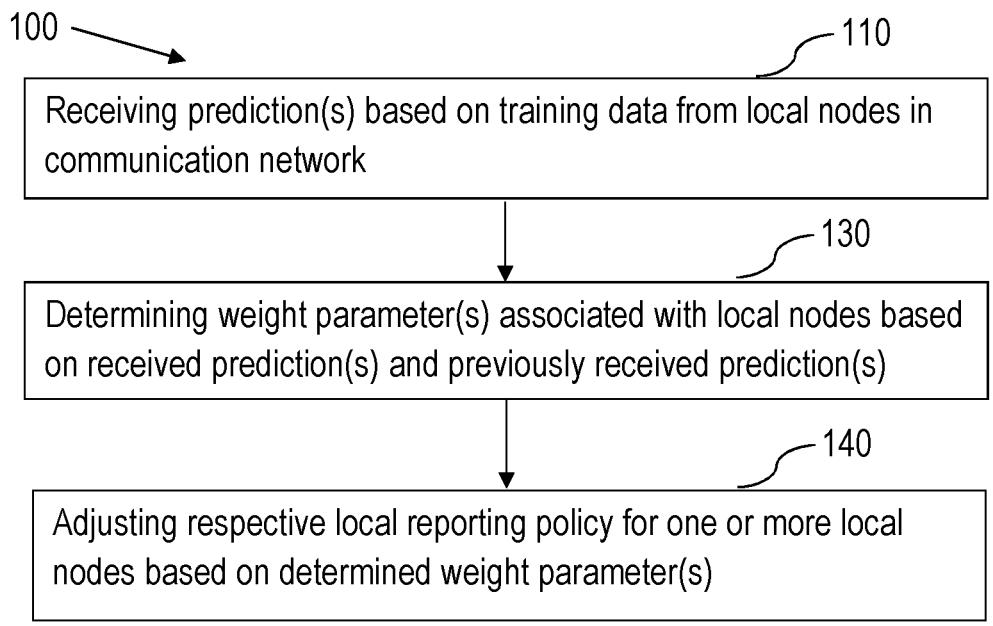
FIG. 1a is a flowchart of a method performed by a master node for predicting one or more metrics associated with a communication network, according to an exemplifying embodiment.

Briefly described, a master node, a local node, a service assurance system, and a respective method performed thereby for predicting one or more metrics associated with a communication network are provided. Nodes in the distributed machine learning scenario that do not have noticeable contribution in improving the overall accuracy of the distributed learning activity are identified and their participation in the distributed learning is deactivated or alternatively limited, via signalling. This allows sparing there local resources for other important system activities/services or simply reduce their bandwidth/energy consumption.

In the light of the above identified challenges, a machine learning approach is described focused on decentralised learning which may significantly enhance the scalability aspect since requirements on the amount of Operation, Administration and Management, OAM, data that needs to be transferred to a central entity (or system) may be drastically reduced as well as the model computation and prediction phases may be parallelised because of the distributed nature of the approach.

However, it's important to understand that distributed machine learning technology is not only beneficial in cloud and datacentre environments as highlighted above but also in the sensor networks and RAN for cellular networks. There may be great benefits to deploy such techniques to mitigate the impact of the limited compute power, energy and bandwidth in such environments. There are new exciting use cases for distributed machine learning also in the emerging areas of internet of Things, IoT, and Edge clouds.

Just to give few examples in sensor networks, there is large number of sensors usually deployed randomly in the environment. These sensors collect environmental data such as temperature, humidity, sound pressure etc. It's highly desired in these cases to find out (i.e. Predict) a quantity (e.g. temperature) at some specific time-instance at some specific geographical coordinates. These use cases may be most efficiently handled by the distributed learning algorithms. Conceptually similar use cases but with a different context may also occur in the RAN networks where operators for example are interested to Predict the mobile signal strength at specific coordinates in the coverage area (e.g. to identify the dead spots).

One limitation common in all these scenarios is that bandwidth and energy requirements are prohibitive to transmit the instrumented data from the sensor nodes to the centralised location particularly because of the resource constrained nature of the local nodes (e.g. sensor nodes, cellular nodes or base-stations). So more communication and computation efficient methods are required in these scenarios; this is exactly where distributed learning comes in. But one big limitation is that many distributed learning algorithms assume that data has been collected from all participating nodes for optimal learning. This becomes a big problem in resource constrained environments running on a battery with limited power for computation and transmission. An approach is disclosed herein which allows optimising the resource consumption of the distributed learning algorithms by disabling or limiting the participation of many nodes (in the distributed learning) without impacting the accuracy performance.

Embodiments herein relate to a method performed by a master node operable in a communication network for predicting one or more metrics associated with the communication network.

Embodiments of such a method will now be described with reference to FIGS. 1a-1b. FIG. 1a illustrates the method 100 comprising receiving 120 prediction(s) based on training data from local nodes in the communication network; and determining 130 weight parameter(s) associated with the local nodes based on the received prediction(s) and previously received predictions. The method 100 further comprises adjusting 140 a respective local reporting policy for one or more local nodes based on the determined weight parameter(s).

The master node is communicating with one or more local nodes in the communication network. The one or more local nodes may perform various predictions in order to detect or predict any problems or anomalies in the communication network. The local node may use training data in order to perform these predictions. Once the local nodes have performed the predictions they send the predictions to the master node. The master node thus receives 120 the prediction(s) from the one or more local nodes. The master node may receive the prediction(s) regularly, irregularly e.g. due to an unexpected occurrence at one of the one or more local nodes or by requesting the prediction(s). Generally, unless a local node is powered-up and started for the first time, the master node has received at least one prediction from the one or more local nodes. The first received prediction from a local node may be referred to a Ground Truth, GT, value for that local node. The master node may thus e.g. compare a newly received prediction (received from local node A) to the GT value for that local node (local node A) and optionally also compare the newly received prediction to one or more previously received prediction from that local node (local node A), received after the GT value. In this manner, the master node may determine if any prediction of any of the one or more local nodes deviates to a certain extent from that local node's GT value and optionally also from previously received one or more predictions from that local node providing the deviating prediction to the master node.

The extent by which a new prediction from a specific local node may deviate from that local node's GT value and optionally also from one or more previously received predictions from that specific local node before being said to deviate to a certain extent may be up to an operator to decide. Merely as a simplified and illustrative example, in one implementation a new prediction may vary within a range of 20% of a previously received prediction, (being at least the GT value and optionally also one or more subsequently received predictions), but any deviation extending beyond 20% is deemed to be cause to take action since the prediction thus varies to a "certain extent". Again, it is stressed that this is merely an illustrative and non-limiting example. Further, different types of predictions may vary more than other types of predictions, some local nodes may be allowed to have more varying predictions than other local nodes etc.

Once the master node has received the prediction(s) from the one or more local nodes, the master node may determine 130 weight parameter(s) associated with the local nodes based on the received prediction(s) and previously received predictions. Merely as a non-limiting and illustrative example, assume a prediction may vary within a range of 5% of e.g. the GT value being a previously received prediction without the master node determining that anything is wrong, then the local node sending that prediction may have a weight parameter of 1. Further in this non-limiting and illustrative example, assume the prediction varies within a range of 15% of the previously received prediction, then the master node determines a weight of 0.8 making the prediction(s) from the local node sending that prediction less important or trustworthy. Still further assume that a variation within a range of 30% of the previously received prediction results in a weight parameter of 0.5 making the prediction(s) from the local node sending that prediction even less important or trustworthy. Yet further in this non-limiting and illustrative example, a deviation with more than 30 from the previously received prediction results in a weight parameter of 0, wherein the master node disregards the new prediction (and perhaps future predictions from originating node sending the prediction to the master node). Instead of the deviation in percentage exemplified above, the master node may calculate accuracy values for received predictions, which accuracy values may be based on the extent of which respective received prediction from respective local node differs from those respective local nodes' GT value and optionally also previously received one or more predictions. Then the master node may use these accuracy values when determining the weight parameter(s) for respective local nodes.

The master node may then adjust 140 the respective local reporting policy for one or more local nodes based on the determined weight parameter(s). Following the above non-limiting and illustrative example, the master node may use determined weights for adjusting the respective local reporting policy for one or more local nodes, meaning that e.g. a local node sending a prediction deviating to an extent so as to generate weight parameter 0 may be associated with a reporting policy wherein the that local node henceforth should send predictions relatively rarely or even refrain from sending predictions to the master node; further meaning that e.g. a local node sending a prediction deviating to an extent so as to generate weight parameter 0.5 may be associated with a reporting policy wherein the that local node henceforth should send predictions e.g. half as often as a local node sending a prediction deviating to an extent so as to generate weight parameter 1. Again, this is a simplified and illustrative example. The reporting policy for individual local nodes may look different from each other and the differences may be based on the determined weight parameter(s). The reporting policy may comprise more information other than a time interval defining how often a local node shall send predictions.

The metrics associated with the communication network may relate to performance, anomalies and other information relative to current circumstances of the communication network. The training data may consists of both measurement data (X) from e.g. sensors associated with local nodes and actual, true or measured values (Y) that the local model shall be learned to predict later. In the prediction phase there are only X, while the Y will be predicted. The predictions may further relate to Operation, Administration and Management, OAM, data. However, the predictions may also relate to other data as will be described in more detail below. The communication network may constitute a datacentre where e.g. temperature may be estimated between the sensors. The communication network may comprise one or more datacentres and also other nodes, arrangements and/or devices. The communication network may comprise system with servers which are interconnected via a network, but the system is a data network within the communication network. Still further, the communication network may be a wired communication network, e.g. a landline communication network such as a Public Switched Telephone Network, PSTN, or a radio/wireless communication network, where e.g. the master node may be a base station controller and the local node(s) may be base stations communicating with sensors, stations, wireless devices etc. The communication network may further be any combination of the above. The list above is non-limiting and only examples of what the communication network may be. Further, in case a local node is not powerful enough to process its own data, then it can share its data with a neighbouring local node so that neighbouring node may act and process this data on the behalf of the less powerful node (i.e. building local model, doing local predictions and transmitting these predictions to the master node).

The method performed by the master node has several advantages. One possible advantage is that overall computation and data communication overhead may be reduced by processing predictions, e.g. OAM data, of the local nodes from which it originates. In case the local node may not be able to process data (i.e. low capacity local nodes), it is possible to process the data in close proximity by sharing data to close neighbouring local nodes. Another possible advantage is that it allows reducing the computation overhead on several of the (selected) local nodes by limiting their participation in distributed learning. Yet another advantage is that it is possible to optionally reduce the frequency of predictions, or prediction cycle, of (selected) local nodes instead of completely deactivating a local node. A possible advantage is that data transmission overhead induced by distributed learning may also be optimised by reducing the frequency and size of the training data transmitted from local nodes to the master node.

The adjusting 140 of the respective local reporting policy may comprise transmitting the respective reporting policy to the one or more local nodes to which the respective reporting policy is intended.

There are different ways of informing the local nodes how to behave according to the local reporting policy. By transmitting respective local reporting policy to the one or more local nodes, each respective local node may be informed of how to behave.

For example, local node A having local reporting policy LRP_A may be informed that it should send predictions to the master node at every "a" time units. Local node B having local reporting policy LRP_B may be informed that it should send predictions to the master node at every "b" time units; and local node C having local reporting policy LRP_B may be informed that it should refrain from sending predictions to the master node.

Figure 1B:
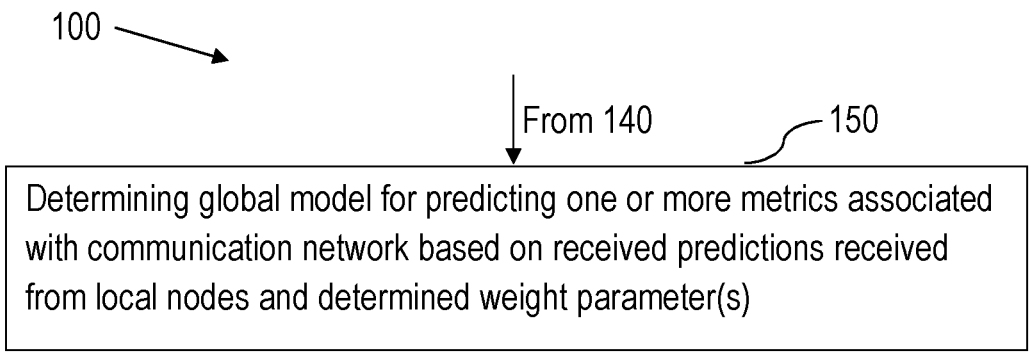
FIG. 1b is a flowchart of a method performed by a master node for predicting one or more metrics associated with a communication network, according to yet an exemplifying embodiment.

The method may further comprise, as illustrated in FIG. 1b, determining 150 a global model for predicting one or more metrics associated with the communication network based on the received prediction(s) from the local nodes and the determined weight parameter(s).

By the received predictions, the master node obtains information about one or more metrics of the communication network. The master node may then use the received predictions together with the determined weight parameter(s) to build the global model for predicting one or more metrics associated with the communication network. The determined weight parameter(s) for individual local node may serve as an indication as to the relevance of predictions received from individual nodes.

The method may still further comprise requesting 110 a first set of predictions based on training data from local nodes in the communication network.

As stated above, the master node may request predictions from one or more local nodes in order to obtain them. Requesting the first set of predictions may be done e.g. at start-up of the master node or start-up of the communication network or start-up of one or more local nodes.

The adjusting 140 of the respective local reporting policy may comprise deactivating a local node having a determined weight parameter not meeting a first threshold, wherein the local node will stop to send predictions to the master node.

By deactivating a local node having a determined weight parameter not meeting the first threshold, the master node may "switch off" receiving predictions from that local node.

It may happen that the local node, e.g. being a sensor of sort, is malfunctioning whereby its predictions may not be correct and thus give false information of the reality to the master node. The master node may detect such a scenario as described above by the predictions of that local node starting to deviate to a certain extent from its GT value and optionally also one or more previously reported prediction(s). The deviation results in the local node having lower accuracy at making predictions.

Reverting to the simplified and non-limiting example above, the master node may determine weight parameters for local nodes depending on the extent (e.g. a ratio or percentage) by which the latest prediction deviates from one or more previous (or just the latest) predictions. The more the prediction deviates from the one or more previously received predictions, the less weight may be given the local node sending the prediction to the master node. For example, when the weight parameter(s) is/are under the first threshold (say merely as an example 0.5 or 50%), the master node may adjust the local reporting policy for that local node so that the local node forthwith refrains from sending predictions to the master node.

Alternatively, or additionally, the adjusting 140 of the respective local reporting policy may comprise activating a previously deactivated node, wherein the local node will start to send predictions to the master node.

It may also happen that, based on the received predictions, the master node adjusts the local reporting policy for a previously deactivated node such that the reporting policy instructs the local node to start sending predictions to the master node.

Merely as an illustrative example, it may be that one or more local nodes neighbouring the previously deactivated local node start sending predictions that deviates from its/their previously sent predictions. The reason may be e.g. that something is going on around the deactivated node. It may also be that overall accuracy at the master node goes below a certain threshold (or some other trigger), wherein the master node may activate a previously deactivated local node in order to achieve higher accuracy of the global prediction done by the master node (global model) based on the local predictions. Again, as an example, assume the local nodes comprises respective sensors sending for example temperature of an area and that a local node was previously deactivated, e.g. due to sending deviating predictions, or because it was deemed not necessary in order to obtain or achieve a fairly accurate prediction of the temperature of the area. Assume further that predictions from one or more of the active local nodes start deviating from their respective GT values and/or previous made predictions; or that the master node determines that a higher accuracy is needed of the global prediction resulting from the global model. The master node may then activate the previously deactivated local node in order to achieve or obtain a global prediction having a higher accuracy.

Still further, the adjusting 140 of the respective local reporting policy may comprise changing the frequency with which a local node sends predictions to the master node depending on the determined weight parameter(s) of the local node.

The local nodes may report with individual frequency, meaning that individual local nodes may send predictions at respective time intervals. For example, a first local node sends predictions with a frequency of 1 prediction per millisecond, a second local node sends predictions with a frequency of 1 prediction per 50 milliseconds and a third local node sends predictions with a frequency of 1 prediction per second. The master node may determine the frequency with which individual local nodes send predictions, e.g. based on the determined weight parameter(s), wherein e.g. the lower the weight parameter(s) the lower the frequency.

The adjusting 140 of the respective local reporting policy may comprise changing the frequency with which a local node sends predictions to the master node depending on (i) prediction accuracy of the received prediction(s) from the local nodes, and/or (ii) the determined weight parameter(s).

There are different ways in which the master node may adjust the respective local reporting policy. As described above, the master node may change the respective frequency with which individual local nodes send prediction(s) to the master node. The master node may base that on e.g. prediction accuracy of the received prediction(s) from the local nodes. The predictions may be more or less accurate. The master node may determine the accuracy of individual predictions based on the GT values and e.g. performing measurements and/or monitoring, wherein the master node may determine the accuracy of individual predictions based on comparing the predictions with the measured values. Then local nodes sending predictions with relatively lower accuracy may send predictions more seldom (lower frequency) as compared to local nodes sending predictions with relatively higher accuracy which may send predictions more often (higher frequency).

Alternatively, or additionally, the master node may base the adjustment of the local reporting policy based on the determined weight parameter(s) as described above.

Still further, the adjusting 140 of the respective local reporting policy may comprise turning off the sending of the predictions from a local node so that the local node just sends raw data.

Instead of the local node sending a prediction the local node may send the data that is used for making the prediction. I.e. assume a local node uses model M that takes a set of data X (raw data) and produces a prediction Y. Then the local node may instead send either X (which often is a very large amount of data) or Y (which is small).

Embodiments herein relate to a method performed by a local node operable in a communication network for predicting one or more metrics associated with the communication network.

Figure 2A:
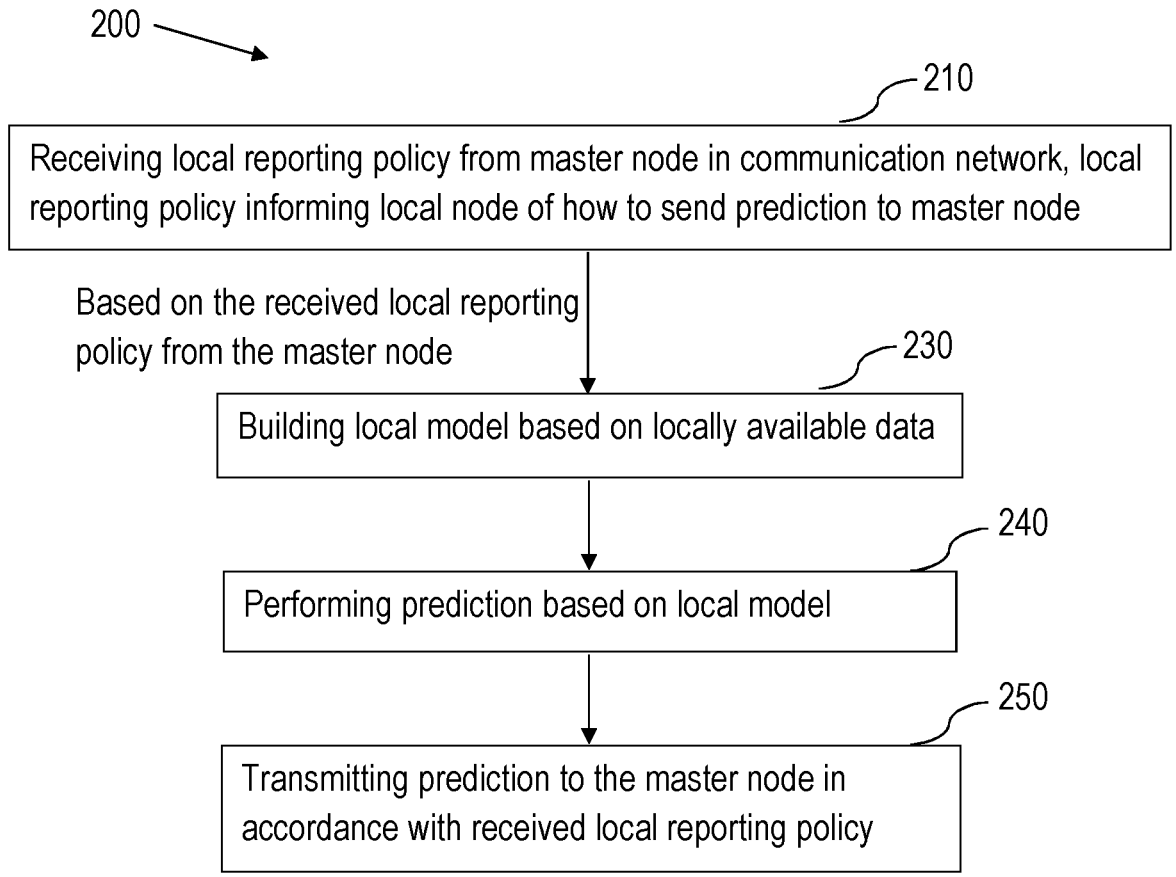
FIG. 2a is a flowchart of a method performed by a local node for predicting one or more metrics associated with a communication network, according to an exemplifying embodiment.

Embodiments of such a method will now be described with reference to FIGS. 2a-2b. FIG. 2a illustrates the method 200 comprising receiving 210 a local reporting policy from a master node in the communication network, the local reporting policy informing the local node of how to send a prediction to the master node. Based on the received local reporting policy from the master node, the method comprises building 230 a local model based on locally available data; performing 240 a prediction based on the local model; and transmitting 250 the prediction to the master node in accordance with the received local reporting policy.

The local node is communicating with the master node as described above. The local node preforms prediction(s) based on a (usually large) amount of data. The local node receives 210 the local reporting policy from the master node in the communication network. The master node will use the prediction from the local node, possible together with prediction(s) from other local node(s), in order to determine one or more metrics associated with the communication network. However, different local nodes may have different local reporting policies, wherein the local node is to send its performed predictions in accordance with its own local reporting policy. By receiving its local reporting policy, the local node is informed of how to send its prediction(s) to the master node.

The local node then builds 230 the local model based on locally available data. The locally available data may comprise training data and optionally also measured, obtained data. Once the local node has built its local model based on the locally available data, the local node may perform 240 the prediction based on the local model. The prediction may comprise an indication of a likely value of one or more metrics based on the part of the communication network represented by the local node. Once the local node has performed the prediction, the local node may send the prediction to the master node in accordance with the received local reporting policy.

The method performed by the local node has the advantages as the method performed by the master node. One possible advantage is that overall computation and data communication overhead may be reduced by processing predictions, e.g. OAM data, of the local nodes from which it originates. In case the local node may not be able to process data (i.e. low capacity local nodes), it is possible to process the data in close proximity by sharing data to close neighbouring local nodes. Another possible advantage is that it allows reducing the computation overhead on several of the (selected) local nodes by limiting their participation in distributed learning. Still a possible advantage is that it is possible to optionally reduce the frequency of predictions, or prediction cycle, of (selected) local nodes instead of completely deactivate a local node. Yet another possible advantage is that data transmission overhead induced by distributed learning may also be optimised by reducing the frequency and size of the training data transmitted from local nodes to the master node.

The received reporting policy may comprise information instructing the local node to activate its predictions, deactivate its predictions or changing the frequency with which the local node transmits predictions to the master node.

As described above, the local reporting policy is specific for individual local nodes. The local reporting policy informs the local node how to send prediction(s) to the master node. In case the local node sends predictions that e.g. are relatively accurate, the local node may probably be sending predictions relatively often, i.e. with a high frequency. However, in comparison, in case the local node sends predictions that e.g. are relatively inaccurate and/or deviates more than to a certain extent from previous sent predictions, the local node will probably be sending predictions relatively seldom, i.e. with a low frequency. Alternatively, the local node may refrain completely from sending predictions to the master node.

Figure 2B:
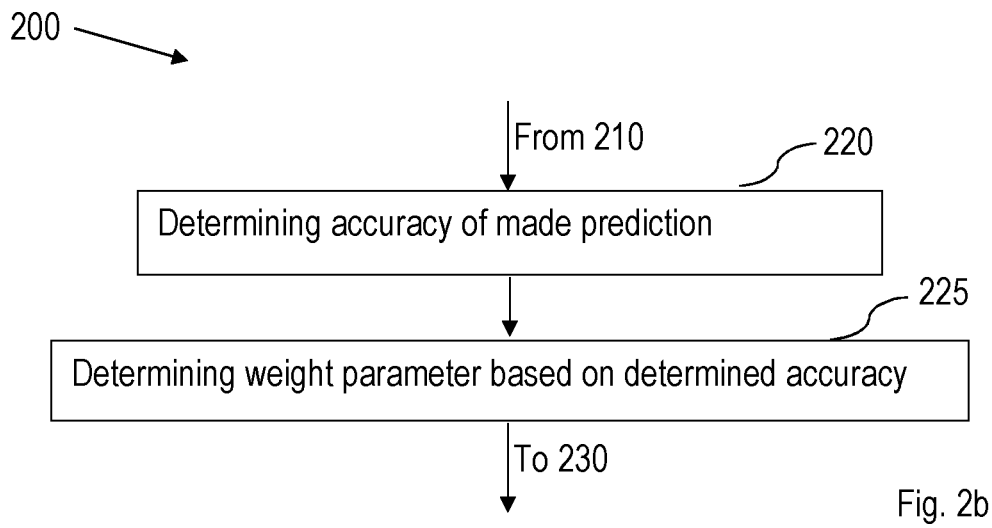
FIG. 2b is a flowchart of a method performed by a local node for predicting one or more metrics associated with a communication network, according to yet an exemplifying embodiment.

The method 200 may further comprise, as illustrated in FIG. 2b, determining 220 an accuracy of a made prediction, and determining 225 a weight parameter based on the determined accuracy.

Different predictions may be more or less accurate. In an example, the local node may itself determine the accuracy of a newly performed prediction. The local node may itself also determine if a newly performed prediction deviates more than to a certain extent from previously performed predictions. Depending on the determined accuracy, the local node may determine a weight parameter associated with itself.

The local node may send also the weight parameter to the master node, wherein the master node may adjust the local reporting policy for the local node based on either one of or both the sent prediction and the sent determined weight parameter.

Embodiments herein relate to a method performed by a service assurance system implemented in a communication network for predicting one or more metrics associated with the communication network. The service assurance system comprises the master node and one or more local nodes as described above. Hence, the method performed by the service assurance system will not be described in any further detail in order to avoid unnecessary repetition.

Figure 3:
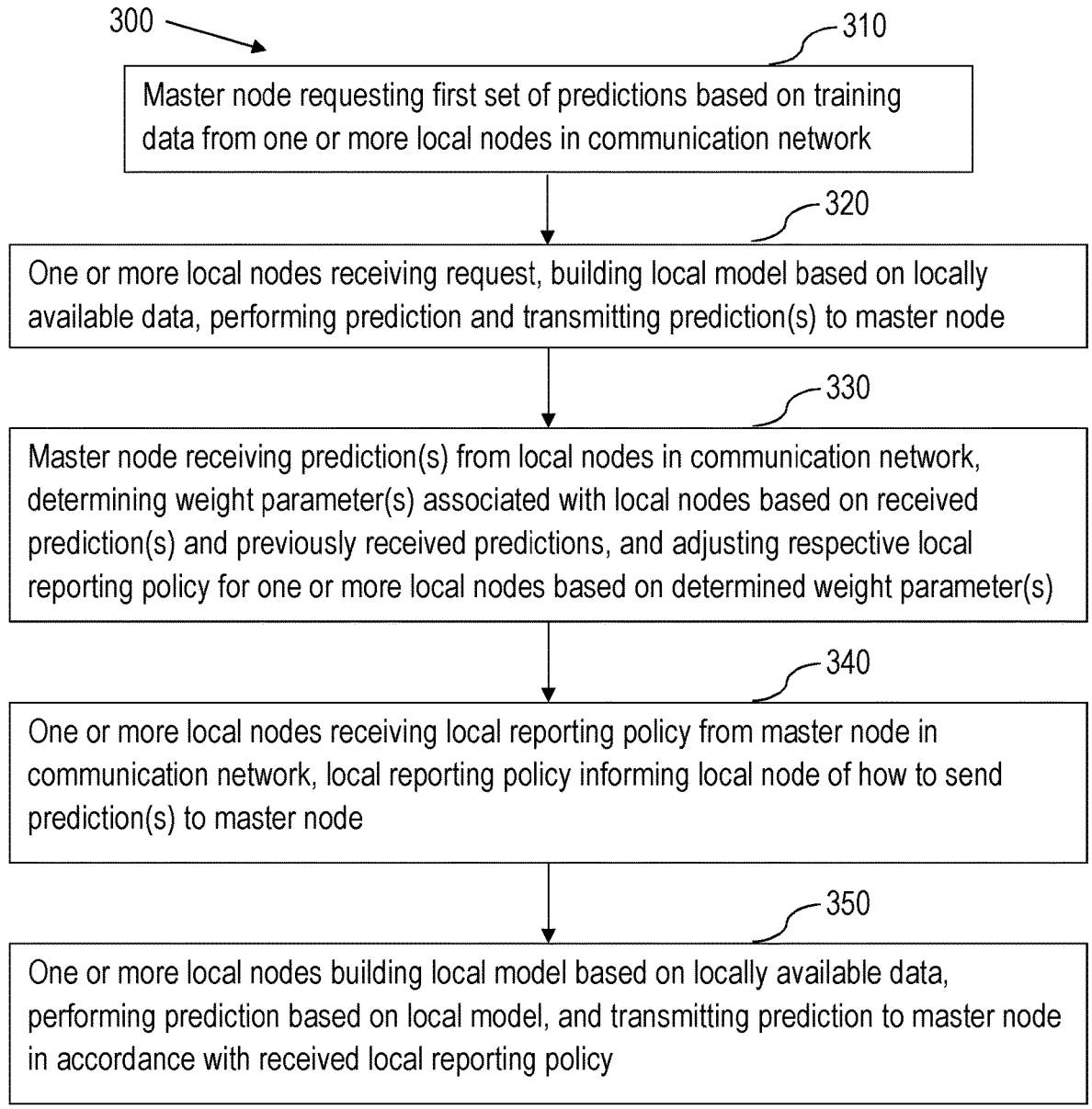
FIG. 3 is a flowchart of a method performed by a service assurance system for predicting one or more metrics associated with a communication network, according to an exemplifying embodiment.

Embodiments of such a method will now be described with reference to FIG. 3. FIG. 3 illustrates the method 300 comprising the master node requesting 310 a first set of predictions based on training data from the one or more local nodes in the communication network; and the one or more local nodes receiving 320 the request, building a local model based on locally available data, performing a prediction and transmitting the prediction(s) to the master node. The method further comprises the master node receiving 330 the prediction(s) from local nodes in the communication network, determining weight parameter(s) associated with the local nodes based on the received prediction(s) and previously received predictions, and adjusting a respective local reporting policy for one or more local nodes based on the determined weight parameter(s). The method 300 also comprises the one or more local nodes receiving 340 the local reporting policy from the master node in the communication network, the local reporting policy informing the local node of how to send prediction(s) to the master node. Based on the received reporting policy from the master node, the method comprises the one or more local nodes building 350 a local model based on locally available data, performing a prediction based on the local model, and transmitting the prediction to the master node in accordance with the received local reporting policy.

The master node and the local nodes are comprised in (or are part of) the communication network. As described above, the communication network may comprise system with servers which are interconnected via a network, but the system is a data network within the communication network. Still further, the communication network may be a wired communication network, e.g. a landline communication network such as a Public Switched Telephone Network, PSTN, or a radio/wireless communication network, where e.g. the master node may be a base station and the local node(s) may be sensors, stations, wireless devices etc. The communication network may further be any combination of the above. Further, as described above, the previously received prediction(s) comprises or constitutes the GT value.

The method performed by the system has the same advantages as the respective method performed by the master node and the local node. One possible advantage is that overall computation and data communication overhead may be reduced by processing predictions, e.g. OAM data, of the local nodes from which it originates. In case the local node may not be able to process data (i.e. low capacity local nodes), it is possible to process the data in close proximity by sharing data to close neighbouring local nodes. Another possible advantage is that it allows reducing the computation overhead on several of the (selected) local nodes by limiting their participation in distributed learning. Still a possible advantage is that it is possible to optionally reduce the frequency of predictions, or prediction cycle, of (selected) local nodes instead of completely deactivate a local node. Yet another possible advantage is that data transmission overhead induced by distributed learning may also be optimised by reducing the frequency and size of the training data transmitted from local nodes to the master node.

Below, the respective methods will be described with reference to FIGS. 4a-4k. Assume that a distributed service is running and is spread across multiple local nodes on a server cluster in a datacentre (DC)/cloud, sensor network, edge network, or cellular network. For illustrative purposes only, the solution is described implemented in a mobile cellular LTE network. In such Radio Access Networks, RANs, many eNodeBs may potentially be or comprising a local node e.g. by locally installing an Analytics Agent, AA. A Central Analytics Agent, CAA, can be installed e.g. on a master node e.g. on Evolved Packet Core, EPC, or virtual EPC, vEPC.

Figure 4A:
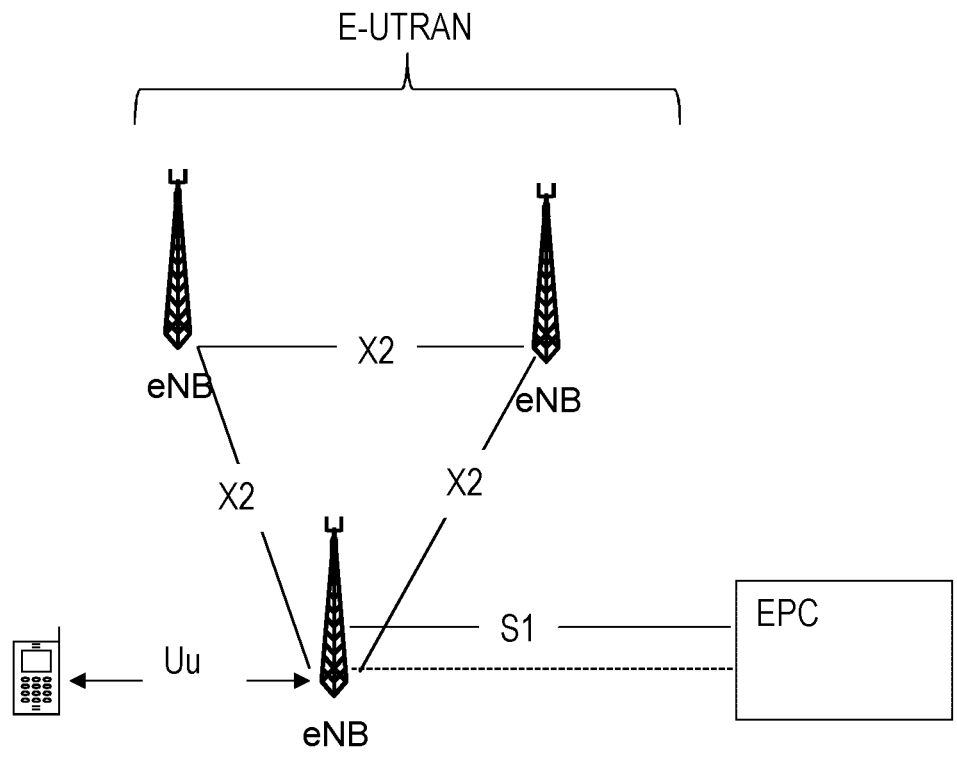
FIG. 4a is a schematic illustration of a RAN of a 4th Generation, 4G, wireless communication network, also known as an LTE wireless communication network.
Figure 4B:
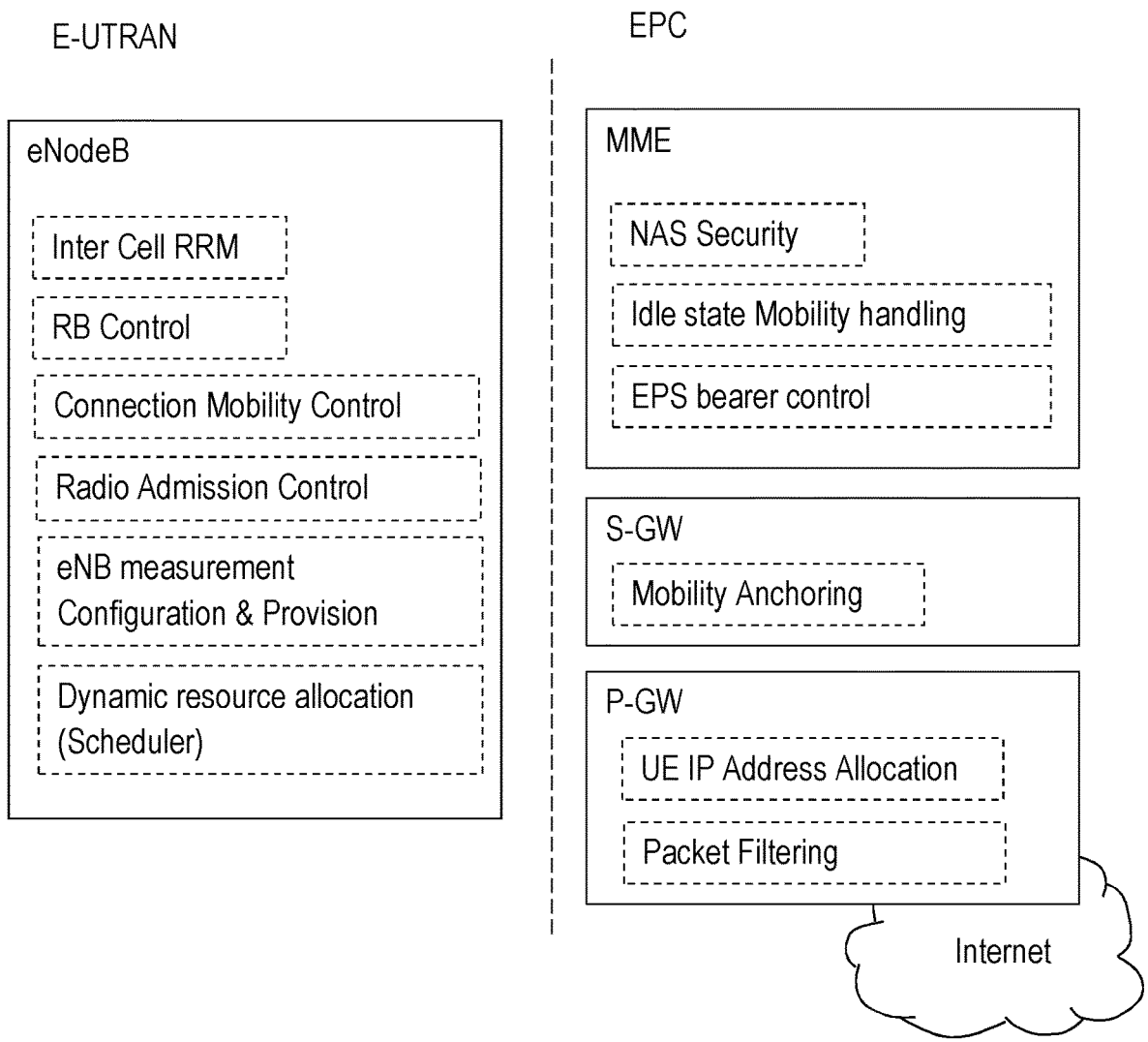
FIG. 4b is a schematic illustration of eNodeB and EPC functions.
Figure 4C:
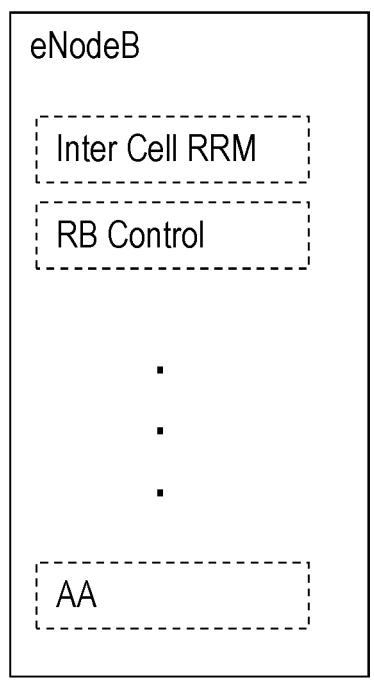
FIG. 4c is a schematic illustration of an example of a modified eNodeB comprising an Analytics Agent, AA.
Figure 4D:
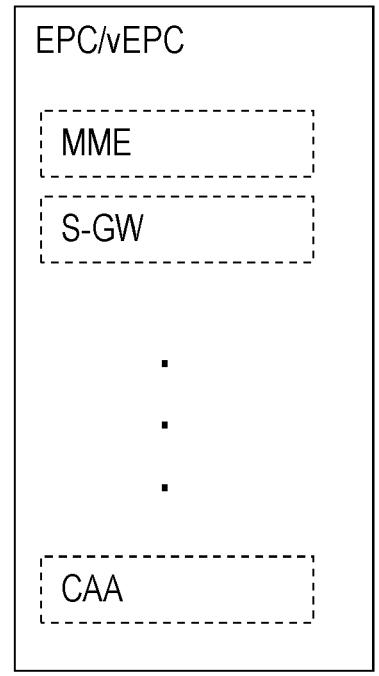
FIG. 4d is a schematic illustration of an example of a modified EPC/vEPC comprising a Central Analytics Agent, CAA.

A typical architecture of an Evolved UMTS Terrestrial Radio Access Network (E-UTRAN) and interaction with EPC in an LTE network is shown in the FIG. 4a. Functional modules of the eNodeB and EPC are shown in FIG. 4b. An exemplifying implementation of the solution comprising the methods described above is illustrated in FIGS. 4c and 4d. In this exemplifying implementation of the solution, the eNodeB and EPC with installed AA and CAA agents are illustrated in the figures. In these networks (e.g. LTE) an eNodeB works as a base-station responsible for the communication with the mobiles (wireless devices) in one or multiple cells. This includes sending the digital or analogue radio transmission signals to the mobiles for the communication as well as handovers. Typically many eNodeBs have limited computation and energy capacity and some of them may also operate on battery or solar energy. Assume a distributed analytics service running on these geographically spread eNodeBs to perform the real-time service characterisation. Under such typical RAN scenarios the solution for optimised resource usage may be used resulting in significant energy and resource savings.

Figure 4E:
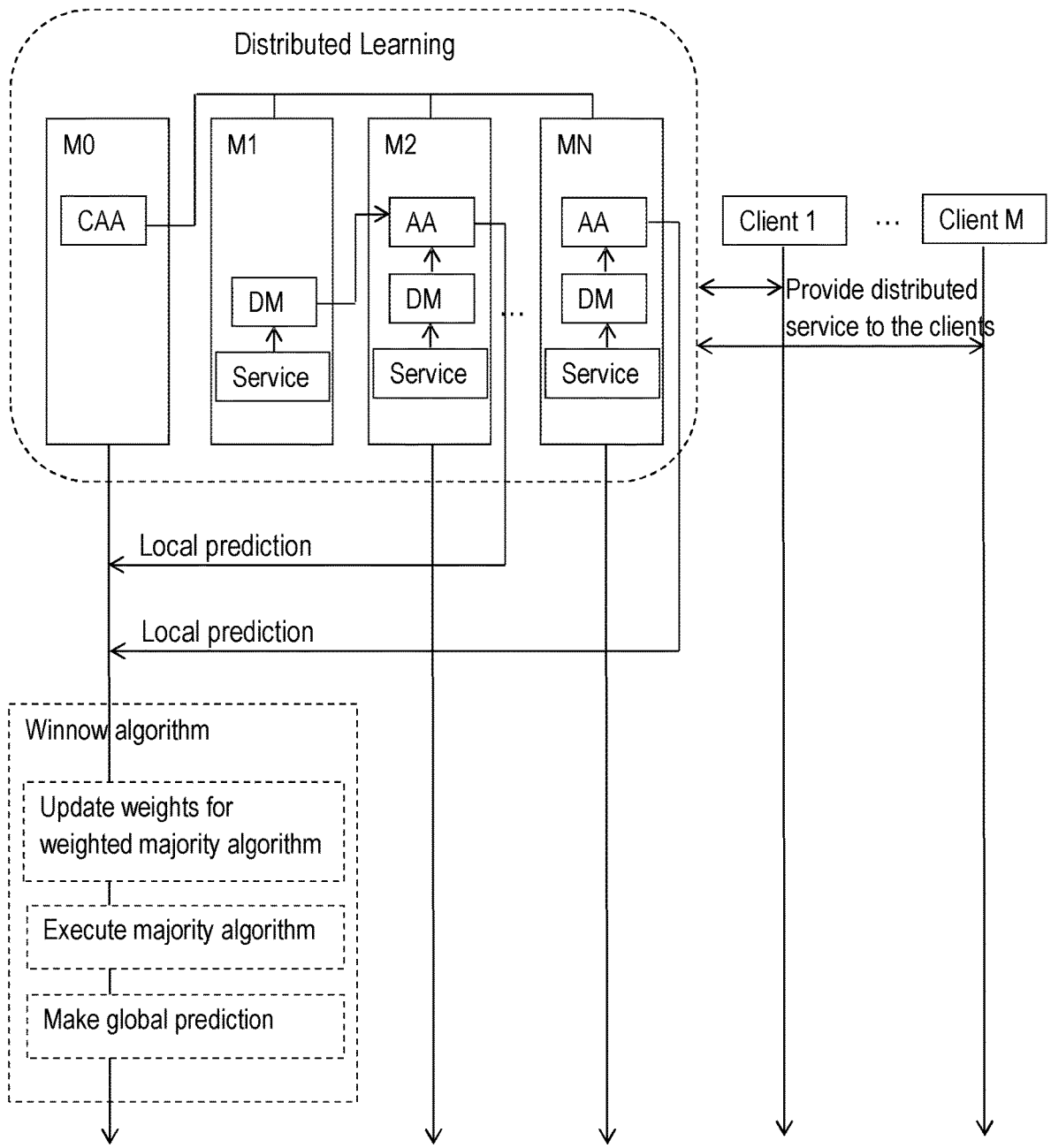
FIG. 4e is a schematic illustration of an example of a timeline view of interaction between system entities.

A general interaction view between the different entities for a system under consideration is shown in FIG. 4e. In general, the system (corresponding to the service assurance system described above) consists of N nodes (in addition to the central M0 node) and m clients connected to avail a distributed application (see FIG. 4e). Each node (corresponding to the above describe local node) may contain one or more modules to provide a part of the service, Data Monitoring and collection, DM, and Analytic Agent, AA, for providing service prediction capabilities. Node M0. (corresponding to the above describe master node) contains the Central Analytics Agent, CAA, responsible to compute the final service prediction. At any time instance t there will be A (A<=N) number of nodes in the activated state (AA is not disabled).

System entities shown in FIG. 5e are as follows:
Master Node (comprising CAA)
Local Nodes (comprising AA)
DM module (Data monitors/collectors attached to local nodes)
Service modules (distributed service components to provide the actual service).

There is a master node (node M0 in the example in FIG. 4e) comprising the CAA executing e.g. a Winnow algorithm steps. Each local node i builds a local model based on the available set of features $X_{Li}$ where the local prediction is represented by $Y_{Li}$ and learned local model on each local node is represented by $M_{Li}: X_{Li} \rightarrow Y_{Li}$. Global set of features available on all local nodes is represented by $X_G$ where $X_G = X_{L1} + X_{L2} + \ldots + X_{LN}$ which is assumed is conceptually required to completely characterise the performance aspects of the distributed service under consideration.

The way the typical distributed learning algorithm operates (e.g. Winnow) will now be described. From FIG. 4e, local service predictions from AAs at these machines are first executed and local prediction results are then sent to the CAA (at $M_0$). CAA updates the associated weights for the different server machines or nodes based on the prediction results (previous steps need to be executed whenever weights needs to be updated at CAA). After the previous steps, the fusion step is executed by the CAA (e.g. weighted majority algorithm) so as to compute the final prediction.

At the high level, CAA (at M0) uses the Winnow algorithm to make the predictions and the CAA works as a data fusion module based on the prediction inputs of all AAs (see FIG. 4e). The algorithm also assigns weights to all participating AA nodes. These weights may have to be calculated/updated e.g. using the training data gathered from local nodes (usually at periodic intervals) participating the distributed learning.

Figure 4F:
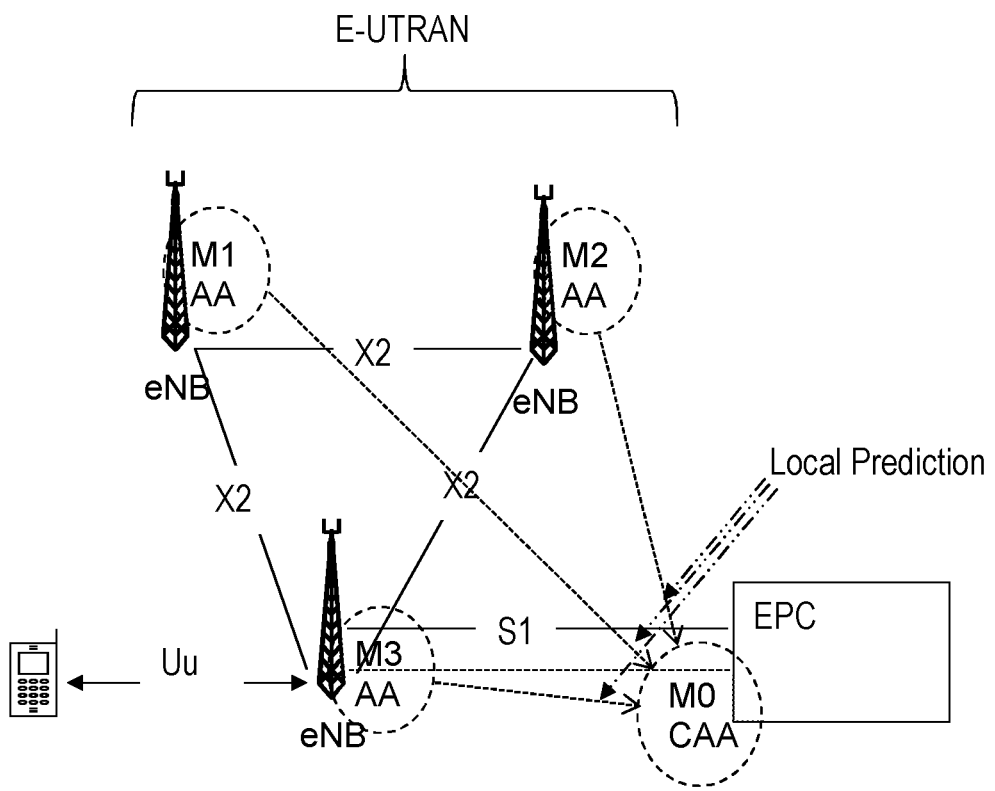
FIG. 4f is a schematic illustration of an example of a distributed learning architecture.

The typical way the Winnow method works for distributed learning is depicted with a 4-node network example in FIG. 4f. Before moving further, the control signals which are sent from CAA to the AAs are defined. Defined control signals are sent from the CAA (at the master node) to the AAs (at the local nodes) to control their participation behaviour in the distributed learning algorithm dynamically under changing workload and resource availability.

If an AA on a local node receives a DEACTIVATE signal it should not participate in the distributed learning (until an ACTIVATE signal is received—sent from CAA). It's an instruction to abort the local cycles of model prediction and updating and hence also prediction transmission to CAA.

If an AA on a local node receives an ACTIVATE signal it should start participating in the distributed learning (until a DEACTIVATE signal is received—sent from CAA). It's an instruction to resume the local cycles of model prediction and updating and hence also prediction transmission to CAA.

Note that by default when the distributed learning initiates it is assumed that all participating nodes are in activated state (that is enabled update and prediction cycles) until and unless they receive a DEACTIVATE signal.

Two optional signal types are also introduced:
CHANGE_FREQ (Predict_Cycle/Update_Cycle) signal allows modifying/changing the frequency of predict and update cycles for a local node instead of completely DEACTIVATE the local node AA. This signal is intended to reduce computation overhead of an AA without completely deactivating it.
TDATA_TRANSMISSION (Size, Freq) which allows adjusting the size (e.g. number of features) as well as frequency of the training data transmitted from the local nodes AA to the CAA in the master node. This signal is intended to reduce the data transmission overhead induced by the distributed learning algorithm by lowering the frequency and size of the training data transmitted from local nodes to the CAA. On the other hand, it may also be used to increase the training data size and frequency of transmission from the nodes which have the dominant weights.

Figure 4G:
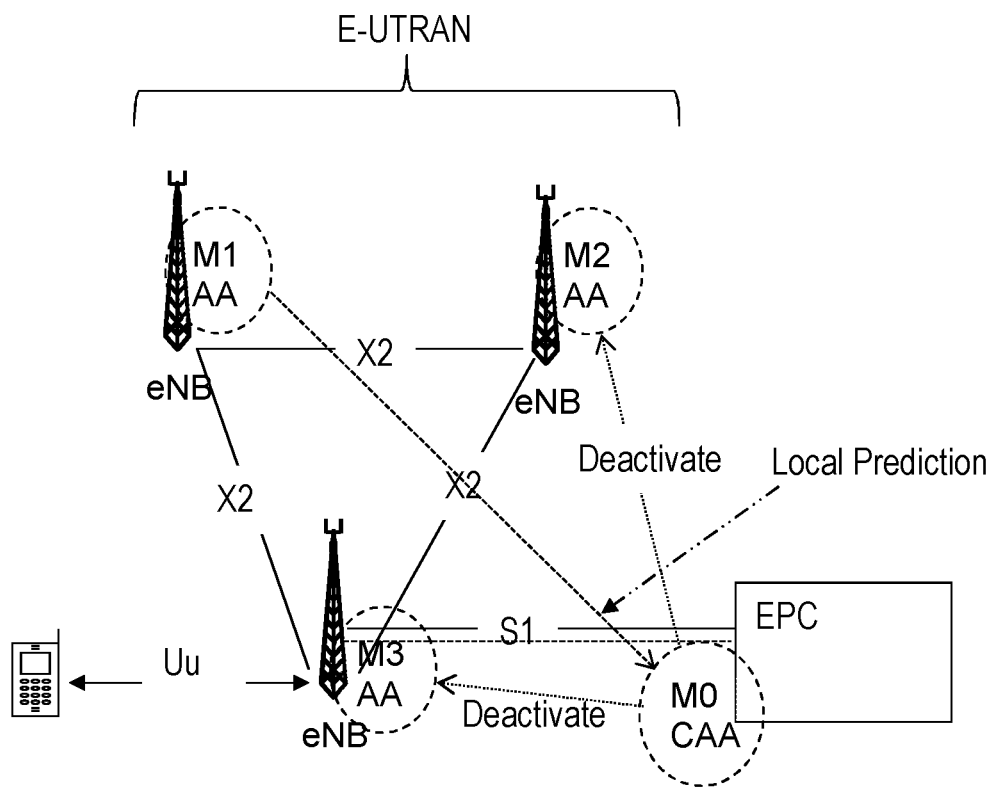
FIG. 4g is a schematic illustration of another example of a distributed learning architecture in accordance with the solutions described herein.

Enhanced Winnow method using solution described herein is depicted in FIG. 4g. M2 and M3 are deactivated and comprised in local nodes (eNBs) and M1 is active and comprised in a local node (eNB). The master node comprising the CAA is in this example implemented in an EPC, Evolved Packet Core.

Assume that local nodes have the computation capability as well as spare resources to do the computation. When operational, procedure essentially consists of model "building/updating cycles" and "prediction cycles".

One phase of the solution is model building and node participation control. This phase needs to be performed during:
Initialisation phase.
If the global model is outdated because of system state changes or concept drift.
An update cycle can also be triggered periodically if new training data is available.

Step 1: Build/Update a local model in each Local Update Cycle at AA: in this step, each of the activated local nodes builds the local model Mu based on the locally available training data.

Step 2: Build/Update the global model during each Global Update Cycle at CAA: Global Update Cycle may update the weights of e.g. the Winnow algorithm parameters in an online fashion:
1. During each update cycle collect new training data at the CAA arriving from AAs of different nodes. Note that training data needs to be collected only from the activated nodes.
2. Updating the global model at CAA involves updating the weight parameters for the Winnow algorithm. Compute/update the weights when the new training data becomes available for all currently participating nodes in distributed learning (to be used by the Winnow algorithm).

Step 3: CAA triggers signalling to control the activation status of local nodes AA: IF there is no concept-drift detection e.g. first Global Update Cycle:
1. Find-out and select the top K number of local nodes that have the dominant importance based on the assigned weight (much higher weight magnitude relative to the other participating nodes in the learning).
2. Send to the other (A-K) active nodes a DEACTIVATE signal. Note that (A-K) can also be zero in many (later) update cycles.
3. Local nodes' AAs receiving the DEACTIVATE signal should deactivate themselves that is disable update and prediction cycles.

ELSE IF there is concept-drift detection or accuracy at CAA falls below a certain threshold value:
1. Trigger signalling and send all the N local nodes: an ACTIVATE signal.
2. Local nodes AAs receiving the ACTIVATE signal should activate themselves, that is enable update and prediction cycles.
3. Reset the weights of e.g. the Winnow algorithm for the next update cycle.

Figure 4H:
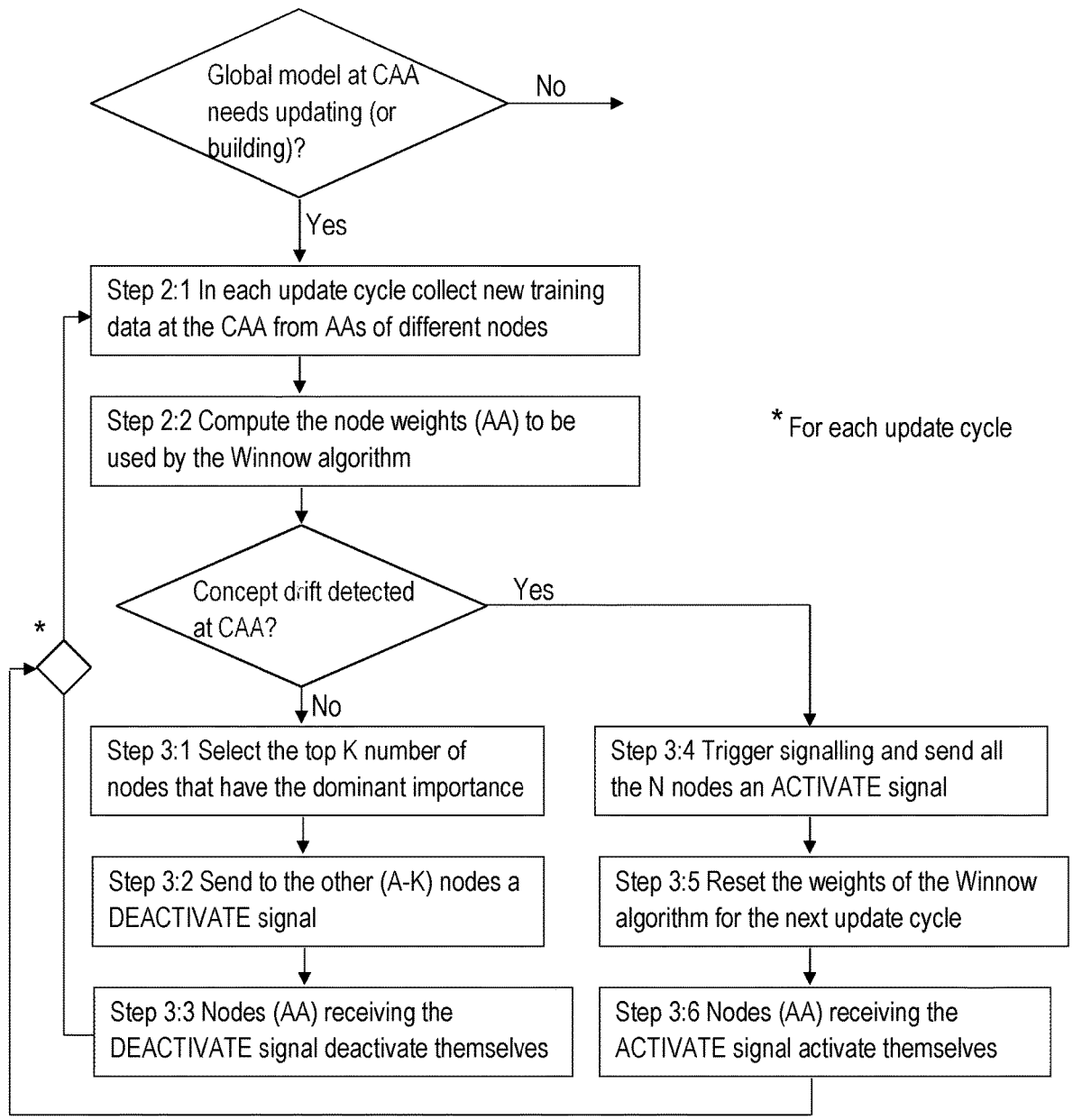
FIG. 4h is a flowchart of an example of a global model updating at CAA and signalling to local nodes (AAs).
Figure 4I:
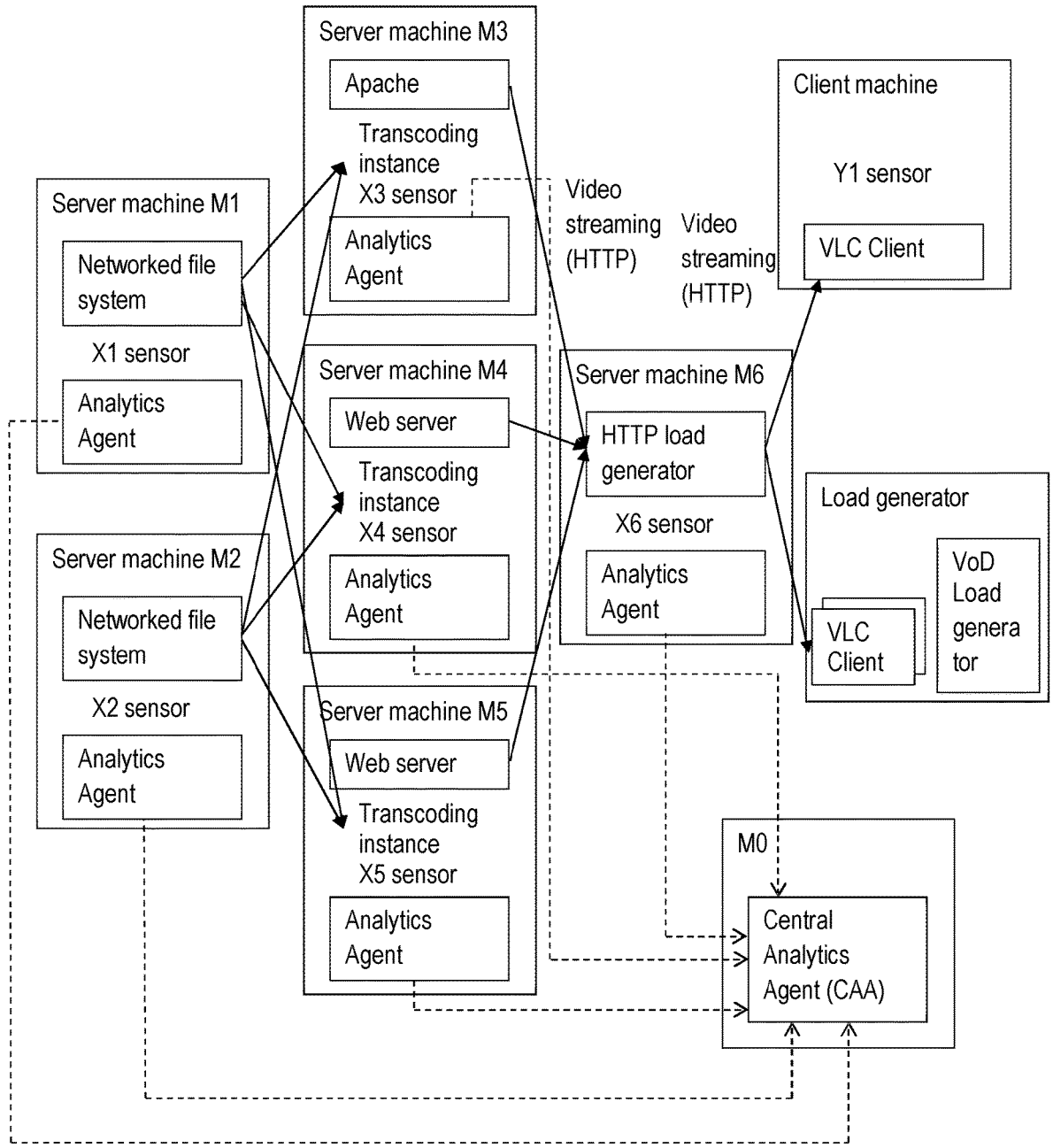
FIG. 4i is an illustration of a test-bed setup.

A control flow chart for the global model update is shown in FIG. 4h. Local computation (at AA) as well as data transmission needs to be done only for the nodes which are in activated state—which may usually be a small subset of the total number of nodes.

It is observed that while here the use of ACTIVATE and DEACTIVATE signals are illustrated to describe the method but it could also be optional signals that have defined earlier to reduce the computation and/or network overhead of the distributed learning (i.e. CHANGE_FREQ, TDATA_TRANSMISSION).

Local and Global Model Prediction Cycles. Step 1: During a Local Prediction Cycle:
Each of the activated local nodes uses the local model Mu to compute the local predictions.
Local predictions made by each of the activated local node are then sent to the CAA.

Step 2: During each Global Prediction Cycle:
CAA may use the local predictions to compute a global prediction e.g. using the Winnow algorithm.

In case of heterogeneous scenarios when some of the nodes do not have the local computation capability (e.g. low capacity nodes) due to insufficient compute or battery resources then their local Winnow participation capabilities may be delegated to one of the neighbouring local nodes comprising AA (or possibly CAA at the master node) on the behalf of the constrained node. Other than this the same procedure may apply as described for as describe above. Note that in some cases it might be better to share the feature data from low capacity nodes to a deactivated local node which may likely have more spare resources.

Some experimental evaluation in a controlled lab environment has been performed to illustrate the effectiveness and performance of the methods performed in local nodes and a master node. A distributed Video on Demand, VoD, service was used. The service is implemented in a testbed on a 6-machines-cluster in a datacentre, DC, which was instrumented for data gathering including a load generator machine (see FIG. 4i). Out of the 6 server machines in the cluster, two are used for backend storage; four are used for the audio/video transcoding and last one as a load balancer for transcoding tasks.

In-network analytics approach is implemented. An ensemble method called Random Forest is used for localised supervised learning on each of the local nodes' AA.

Figure 4J:
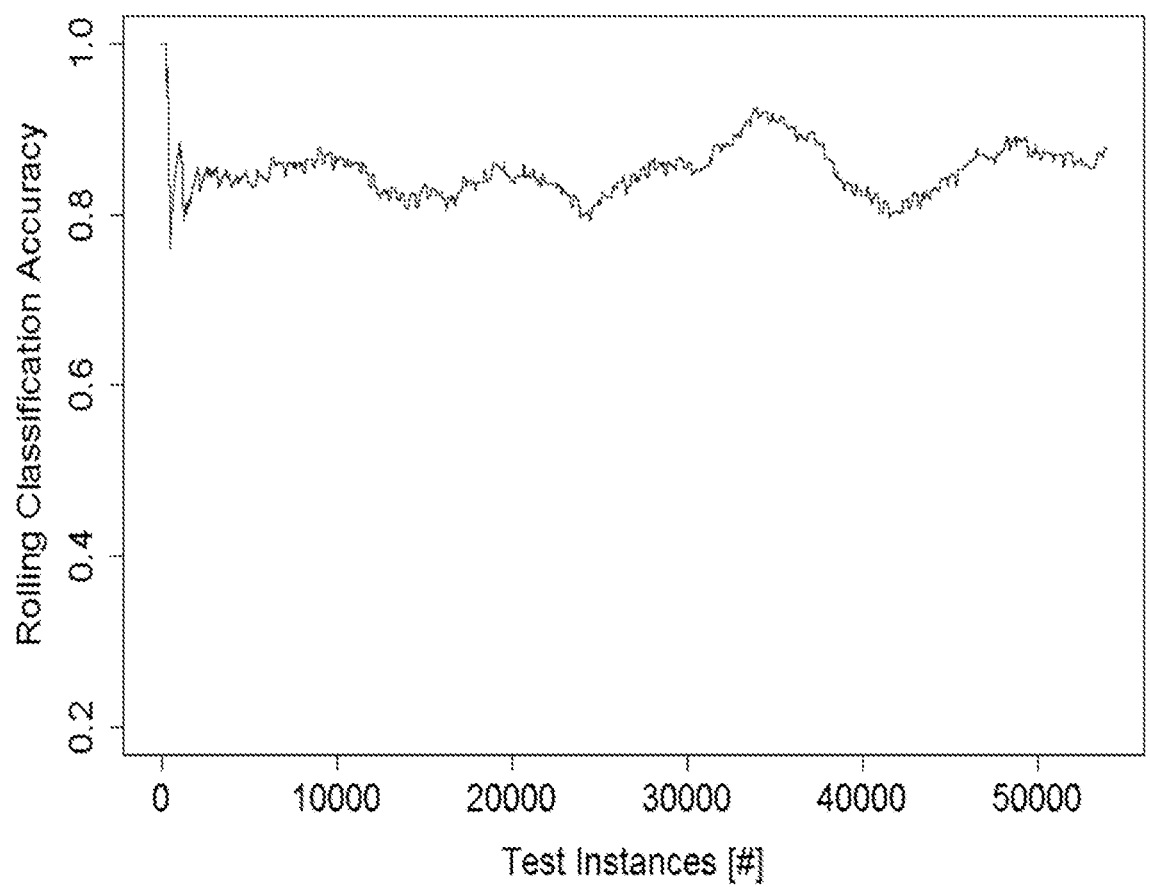
FIG. 4j is a graph of prediction accuracy performance of the solution described herein according to the test-bed setup and test result.

From one of the evaluations, prediction accuracy performance over time is depicted in FIG. 4j. Prediction accuracy remains in 80-85% range most of the time. In FIG. 4k, it can be seen that node M4 and M5 have the dominant weights as calculated by the CAA. So it's sufficient to keep only these nodes ACTIVATE while rest of the nodes can be DEACTIVATE without impacting prediction accuracy. It works since the DEACTIVATE nodes have substantially smaller voting weights in the Winnow algorithm to have any noticeable impact on prediction accuracy. End result in this case is that it was possible to DEACTIVATE 66% of the nodes without impacting accuracy of the distributed learning algorithm leading to spare compute and battery resources. As clarified earlier it's also possible to lower the distributed learning participation activity instead of complete disabling the local nodes.

Deactivating nodes participation in distributed learning for longer time periods may result in more optimised use of valuable system resources (e.g. saving of valuable compute and battery resources that could be used by different other core service components running on these nodes).

Embodiments herein also relate to a master node operable in a communication network for predicting one or more metrics associated with the communication network. Exemplifying embodiments of such a master node will now be described with reference to FIGS. 5 and 6. The master node has the same technical features, objects and advantages as the method performed by the master node. The master node will hence only be described in brief in order to avoid unnecessary repetition.

Figure 5:
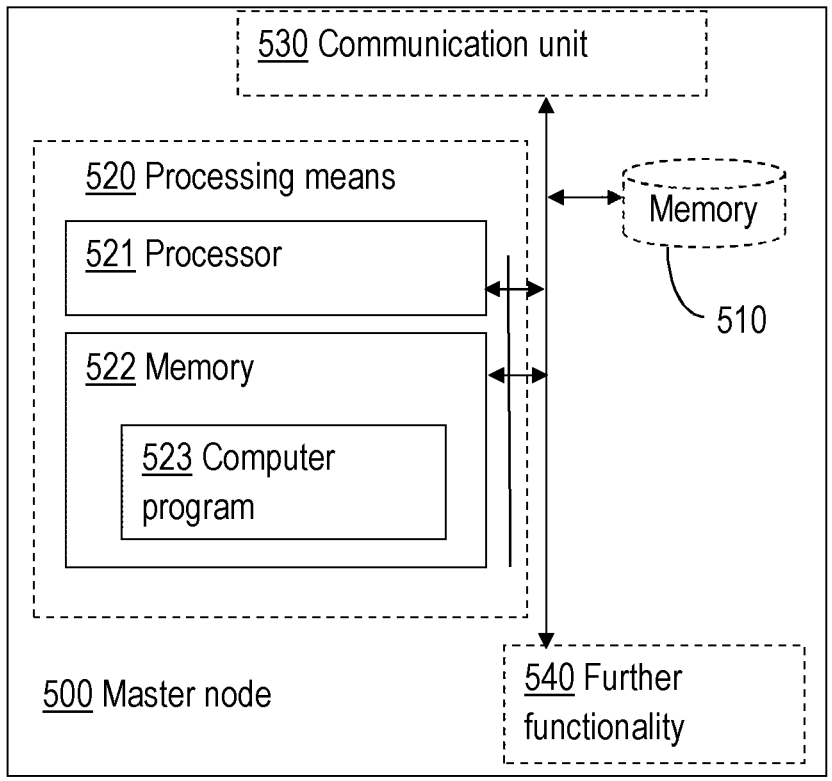
FIG. 5 is a block diagram of a master node for predicting one or more metrics associated with a communication network, according to an exemplifying embodiment.
Figure 6:
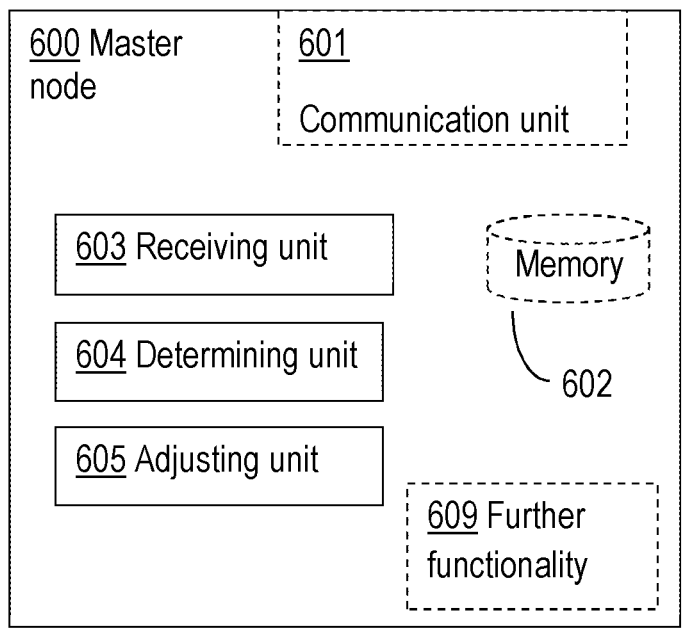
FIG. 6 is a block diagram of a master node for predicting one or more metrics associated with a communication network, according to yet an exemplifying embodiment.

FIGS. 5 and 6 Illustrate the master node 500, 600 being configured for receiving prediction(s) based on training data from local nodes in the communication network; determining weight parameter(s) associated with the local nodes based on the received prediction(s) and previously received predictions; and adjusting a respective local reporting policy for one or more local nodes based on the determined weight parameter(s).

The master node 500, 600 may be implemented or realised in different ways. An exemplifying implementation is illustrated in FIG. 5. FIG. 5 illustrates the master node 500 comprising a processor 521 and memory 522, the memory comprising instructions, e.g. by means of a computer program 523, which when executed by the processor 521 causes the master node 500 to receive prediction(s) based on training data from local nodes in the communication network; to determine weight parameter(s) associated with the local nodes based on the received prediction(s) and previously received predictions; and to adjust a respective local reporting policy for one or more local nodes based on the determined weight parameter(s).

FIG. 5 also illustrates the master node 500 comprising a memory 510. It shall be pointed out that FIG. 5 is merely an exemplifying illustration and memory 510 may optionally, be a part of the memory 522 or be a further memory of the master node 500 operable in a communication network. The memory may for example comprise information relating to the master node 500, to statistics of operation of the master node 500, just to give a couple of illustrating examples. FIG. 5 further illustrates the master node 500 comprising processing means 520, which comprises the memory 522 and the processor 521. Still further, FIG. 5 illustrates the master node 500 comprising a communication unit 530. The communication unit 530 may comprise an interface through which the master node 500 communicates with other nodes, servers, wireless devices or entities of the communication network. FIG. 5 also illustrates the master node 500 comprising further functionality 540. The further functionality 540 may comprise hardware of software necessary for the master node 500 to perform different tasks that are not disclosed herein.

An alternative exemplifying implementation of the master node 500, 600 is illustrated in FIG. 6. FIG. 6 illustrates the master node 600 comprising a receiving unit 603 for receiving prediction(s) based on training data from local nodes in the communication network. FIG. 6 also illustrates the master node 600 comprising a determining unit 604 for determining weight parameter(s) associated with the local nodes based on the received prediction(s) and previously received predictions; and an adjusting unit 605 for adjusting a respective local reporting policy for one or more local nodes based on the determined weight parameter(s).

In FIG. 6, the master node 600 operable in a communication network is also illustrated comprising a communication unit 601. Through this unit, the master node 600 is adapted to communicate with other nodes and/or entities in the communication network. The communication unit 601 may comprise more than one receiving arrangement. For example, the communication unit may be connected to both a wire and an antenna, by means of which the master node 600 is enabled to communicate with other nodes and/or entities in the communication network. Similarly, the communication unit 601 may comprise more than one transmitting arrangement, which in turn are connected to both a wire and an antenna, by means of which the master node 600 is enabled to communicate with other nodes and/or entities in the communication network. The master node 600 further comprises a memory 602 for storing data. Further, the master node 600 may comprise a control or processing unit (not shown) which in turn is connected to the different units 603-605. It shall be pointed out that this is merely an illustrative example and the master node 600 may comprise more, less or other units or modules which execute the functions of the master node 600 in the same manner as the units illustrated in FIG. 6.

It should be noted that FIG. 6 merely illustrates various functional units in the master node 600 in a logical sense. The functions in practice may be implemented using any suitable software and hardware means/circuits etc. Thus, the embodiments are generally not limited to the shown structures of the master node 600 and the functional units. Hence, the previously described exemplary embodiments may be realised in many ways. For example, one embodiment includes a computer-readable medium having instructions stored thereon that are executable by the control or processing unit for executing the method steps in the master node 600. The instructions executable by the computing system and stored on the computer-readable medium perform the method steps of the master node 600 as set forth in the claims.

The master node has the same possible advantages as the method performed by the master node. One possible advantage is that overall computation and data communication overhead may be reduced by processing predictions, e.g. OAM data, of the local nodes from which it originates. In case the local node may not be able to process data (i.e. low capacity local nodes), it is possible to process the data in close proximity by sharing data to close neighbouring local nodes. Another possible advantage is that it allows reducing the computation overhead on several of the (selected) local nodes by limiting their participation in distributed learning. Still a possible advantage is that it is possible to optionally reduce the frequency of predictions, or prediction cycle, of (selected) local nodes instead of completely deactivate a local node. Yet another possible advantage is that data transmission overhead induced by distributed learning may also be optimised by reducing the frequency and size of the training data transmitted from local nodes to the master node.

According to an embodiment, the master node 500, 600 is configured for adjusting the respective local reporting policy by transmitting the respective reporting policy to the one or more local nodes to which the respective reporting policy is intended.

According to yet an embodiment, the master node 500, 600 is configured for determining a global model for predicting one or more metrics associated with the communication network based on the received prediction(s) from the local nodes and the determined weight parameter(s).

According to still an embodiment, the master node 500, 600 is configured for requesting a first set of predictions based on training data from local nodes in the communication network.

According to a further embodiment, the master node 500, 600 is configured for adjusting the respective local reporting policy by deactivating a local node having a determined weight parameter not meeting a first threshold, wherein the local node will stop to send predictions to the master node.

According to another embodiment, the master node 500, 600 is configured for adjusting the respective local reporting policy by activating a previously deactivated node, wherein the local node will start to send predictions to the master node.

According to an embodiment, the master node 500, 600 is configured for adjusting the respective local reporting policy by changing the frequency with which a local node sends predictions to the master node depending on the determined weight parameter(s) of the local node.

According to yet an embodiment, the master node 500, 600 is configured for adjusting the respective local reporting policy by changing the frequency with which a local node sends predictions to the master node depending on (i) prediction accuracy of the received prediction(s) from the local nodes, and/or (ii) the determined weight parameter(s).

According to still an embodiment, the master node 500, 600 is configured for adjusting the respective local reporting policy by turning off the sending of the predictions from a local node so that the local node just sends raw data.

Embodiments herein also relate to a local node operable in a communication network for predicting one or more metrics associated with the communication network. Exemplifying embodiments of such a local node will now be described with reference to FIGS. 7 and 8. The local node has the same technical features, objects and advantages as the method performed by the local node. The local node will hence only be described in brief in order to avoid unnecessary repetition.

Figure 7:
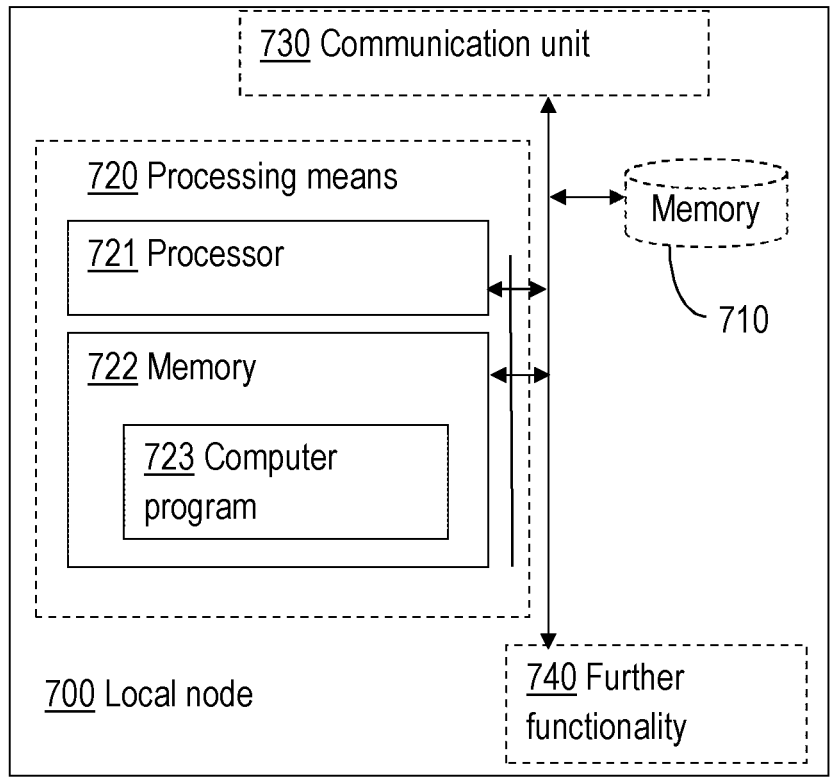
FIG. 7 is a block diagram of a local node for predicting one or more metrics associated with a communication network, according to an exemplifying embodiment.
Figure 8:
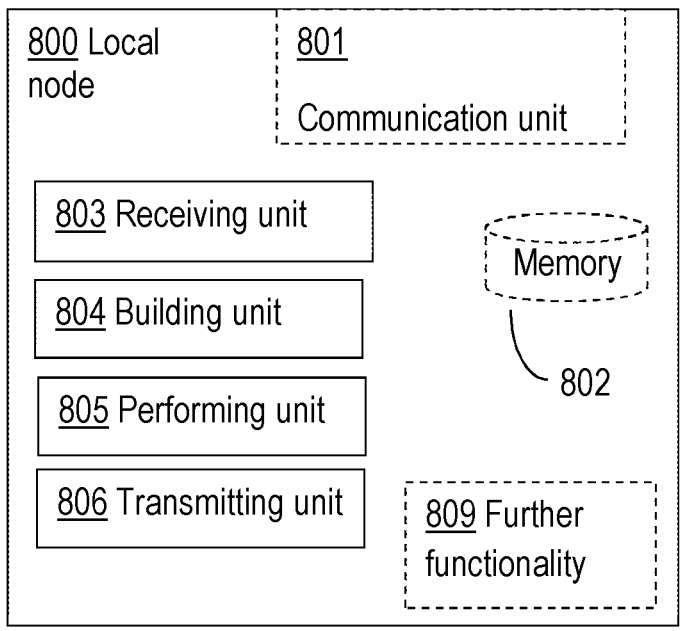
FIG. 8 is a block diagram of a local node for predicting one or more metrics associated with a communication network, according to still an exemplifying embodiment.

FIGS. 7 and 8 Illustrate the local node 700, 800 being configured for receiving a local reporting policy from a master node in the communication network, the local reporting policy informing the local node of how to send a prediction to the master node. Based on the received local reporting policy from the master node, the local node 700, 800 is configured for building a local model based on locally available data; performing a prediction based on the local model; and transmitting the prediction to the master node in accordance with the received local reporting policy.

The local node 700, 800 may be implemented or realised in different ways. An exemplifying implementation is illustrated in FIG. 7. FIG. 7 illustrates the local node 700 comprising a processor 721 and memory 722, the memory comprising instructions, e.g. by means of a computer program 723, which when executed by the processor 721 causes the local node 700 to being operable to receive a local reporting policy from a master node in the communication network, the local reporting policy informing the local node of how to send a prediction to the master node. The memory further comprises instructions, e.g. by means of a computer program 723, which when executed by the processor 721 causes the local node 700 to, based on the received local reporting policy from the master node, build a local model based on locally available data; to perform a prediction based on the local model; and to transmit the prediction to the master node in accordance with the received local reporting policy.

FIG. 7 also illustrates the local node 700 comprising a memory 710. It shall be pointed out that FIG. 7 is merely an exemplifying illustration and memory 710 may optionally, be a part of the memory 722 or be a further memory of the local node 700 operable in a communication network. The memory may for example comprise information relating to the local node 700, to statistics of operation of the local node 700, just to give a couple of illustrating examples. FIG. 7 further illustrates the local node 700 comprising processing means 720, which comprises the memory 722 and the processor 721. Still further, FIG. 7 illustrates the local node 700 comprising a communication unit 730. The communication unit 730 may comprise an interface through which the local node 700 communicates with other nodes, servers, wireless devices or entities of the communication network. FIG. 7 also illustrates the local node 700 comprising further functionality 740. The further functionality 740 may comprise hardware of software necessary for the local node 700 to perform different tasks that are not disclosed herein.

An alternative exemplifying implementation of the local node 700, 800 is illustrated in FIG. 8. FIG. 8 illustrates the local node 800 comprising a receiving unit 803 for receiving a local reporting policy from a master node in the communication network, the local reporting policy informing the local node of how to send a prediction to the master node. FIG. 8 also illustrates the local node 800 comprising a building unit 804 for building a local model based on locally available data; a performing unit 805 for performing a prediction based on the local model and a transmitting unit 806 for transmitting the prediction to the master node in accordance with the received local reporting policy; wherein the building of the local model, the performing of the prediction and the transmission of the prediction is based on the received local reporting policy from the master node.

In FIG. 8, the local node 800 is also illustrated comprising a communication unit 801. Through this unit, the local node 800 is adapted to communicate with other nodes and/or entities in the communication network. The communication unit 801 may comprise more than one receiving arrangement. For example, the communication unit may be connected to both a wire and an antenna, by means of which the local node 800 is enabled to communicate with other nodes and/or entities in the communication network. Similarly, the communication unit 801 may comprise more than one transmitting arrangement, which in turn are connected to both a wire and an antenna, by means of which the local node 800 is enabled to communicate with other nodes and/or entities in the communication network. The local node 800 further comprises a memory 802 for storing data. Further, the local node 800 may comprise a control or processing unit (not shown) which in turn is connected to the different units 803-806. It shall be pointed out that this is merely an illustrative example and the local node 800 may comprise more, less or other units or modules which execute the functions of the local node 800 in the same manner as the units illustrated in FIG. 8.

It should be noted that FIG. 8 merely illustrates various functional units in the local node 800 in a logical sense. The functions in practice may be implemented using any suitable software and hardware means/circuits etc. Thus, the embodiments are generally not limited to the shown structures of the local node 800 and the functional units. Hence, the previously described exemplary embodiments may be realised in many ways. For example, one embodiment includes a computer-readable medium having instructions stored thereon that are executable by the control or processing unit for executing the method steps in the local node 800. The instructions executable by the computing system and stored on the computer-readable medium perform the method steps of the local node 800 as set forth in the claims.

The local node has the same possible advantages as the method performed by the local node. One possible advantage is that overall computation and data communication overhead may be reduced by processing predictions, e.g. OAM data, of the local nodes from which it originates. In case the local node may not be able to process data (i.e. low capacity local nodes), it is possible to process the data in close proximity by sharing data to close neighbouring local nodes. Another possible advantage is that it allows reducing the computation overhead on several of the (selected) local nodes by limiting their participation in distributed learning. Still a possible advantage is that it is possible to optionally reduce the frequency of predictions, or prediction cycle, of (selected) local nodes instead of completely deactivate a local node. Yet another possible advantage is that data transmission overhead induced by distributed learning may also be optimised by reducing the frequency and size of the training data transmitted from local nodes to the master node.

According to an embodiment, the received reporting policy comprises information instructing the local node to activate its predictions, deactivate its predictions or changing the frequency with which the local node transmits predictions to the master node.

According to an embodiment, the local node 700, 800 is configured for determining an accuracy of a made prediction, and determining a weight parameter based on the determined accuracy.

Embodiments herein also relate to a service assurance system implemented in a communication network for predicting one or more metrics associated with the communication network. The service assurance system has the same technical features, objects and advantages as the method performed by the service assurance system. The service assurance system will hence only be described in brief in order to avoid unnecessary repetition.

The service assurance system is configured for the master node 500, 600 requesting a first set of predictions based on training data from one or more local nodes in the communication network; and the one or more local nodes 700, 800 receiving the request, building a local model based on locally available data, performing a prediction and transmitting the prediction(s) to the master node. Further, the master node 500, 600 receiving the prediction(s) from local nodes in the communication network, determining weight parameter(s) associated with the local nodes based on the received prediction(s) and previously received predictions, and adjusting a respective local reporting policy for one or more local nodes based on the determined weight parameter(s); and the one or more local nodes 700, 800 receiving the local reporting policy from the master node in the communication network, the local reporting policy informing the local node of how to send prediction(s) to the master node. The service assurance system is further configured for, based on the received reporting policy from the master node, the one or more local nodes 700, 800 building a local model based on locally available data, performing a prediction based on the local model, and transmitting the prediction to the master node in accordance with the received local reporting policy.

The service assurance system has the same possible advantages as the method performed by the service assurance system. One possible advantage is that overall computation and data communication overhead may be reduced by processing predictions, e.g. OAM data, of the local nodes from which it originates. In case the local node may not be able to process data (i.e. low capacity local nodes), it is possible to process the data in close proximity by sharing data to close neighbouring local nodes. Another possible advantage is that it allows reducing the computation overhead on several of the (selected) local nodes by limiting their participation in distributed learning. Still a possible advantage is that it is possible to optionally reduce the frequency of predictions, or prediction cycle, of (selected) local nodes instead of completely deactivate a local node. Yet another possible advantage is that data transmission overhead induced by distributed learning may also be optimised by reducing the frequency and size of the training data transmitted from local nodes to the master node.

Figure 9:
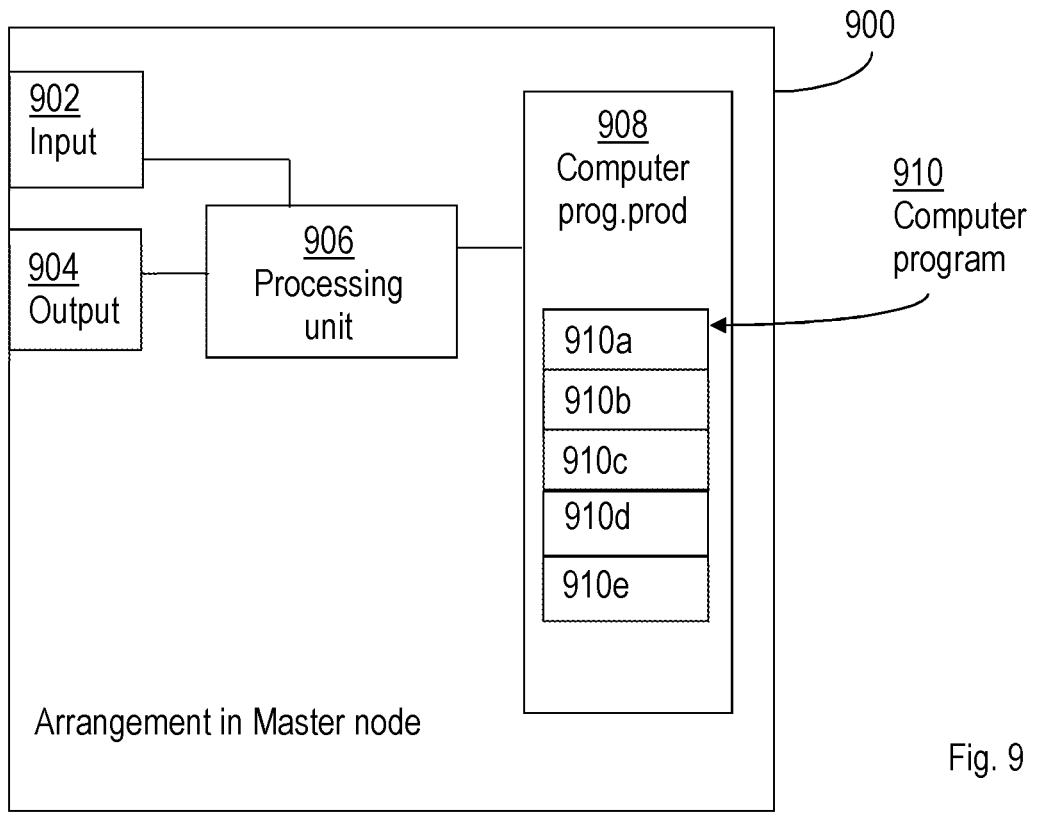
FIG. 9 is a block diagram of an arrangement in a master node for predicting one or more metrics associated with a communication network, according to an exemplifying embodiment.

FIG. 9 schematically shows an embodiment of an arrangement 900 in a master node 600 operable in a communication network. Comprised in the arrangement 900 in the master node 600 are here a processing unit 906, e.g. with a DSP. The processing unit 906 may be a single unit or a plurality of units to perform different actions of procedures described herein. The arrangement 900 in the master node 600 may also comprise an input unit 902 for receiving signals from other entities, and an output unit 904 for providing signal(s) to other entities. The input unit and the output unit may be arranged as an integrated entity or as illustrated in the example of FIG. 6, as one or more interfaces 601.

Furthermore, the arrangement 900 in the master node 600 comprises at least one computer program product 908 in the form of a non-volatile memory, e.g. an EEPROM, a flash memory and a hard drive. The computer program product 908 comprises a computer program 910, which comprises code means, which when executed in the processing unit 906 in the arrangement 900 in the master node 600 operable in the communication network causes master node 600 to perform the actions e.g. of the procedure described earlier in conjunction with FIGS. 1a-1b.

The computer program 910 may be configured as a computer program code structured in computer program modules 910a-910e. Hence, in an exemplifying embodiment, the code means in the computer program of the arrangement 900 in the master node 600 comprises a receiving unit, or module, for receiving prediction(s) based on training data from local nodes in the communication network. The computer program further comprises a determining unit, or module, for determining weight parameter(s) associated with the local nodes based on the received prediction(s) and previously received predictions; and an adjusting unit, or module, for adjusting a respective local reporting policy for one or more local nodes based on the determined weight parameter(s).

The computer program modules could essentially perform the actions of the flow illustrated in FIGS. 1a-1b, to emulate the master node 600 operable in the communication network. In other words, when the different computer program modules are executed in the processing unit 906, they may correspond to the units 603-605 of FIG. 6.

Figure 10:
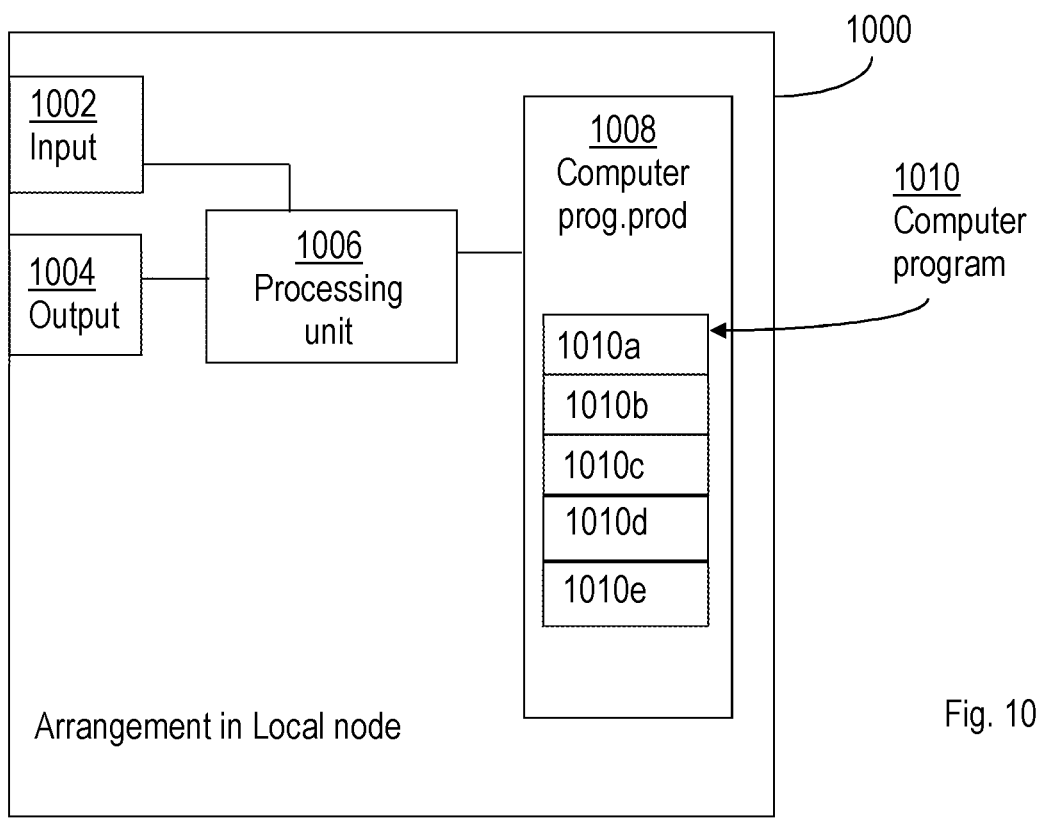
FIG. 10 is a block diagram of an arrangement in a local node for predicting one or more metrics associated with a communication network, according to an exemplifying embodiment.

FIG. 10 schematically shows an embodiment of an arrangement 1000 in a local node 800 operable in a communication network. Comprised in the arrangement 1000 in the local node 800 are here a processing unit 1006, e.g. with a DSP. The processing unit 1006 may be a single unit or a plurality of units to perform different actions of procedures described herein. The arrangement 1000 in the local node 800 may also comprise an input unit 1002 for receiving signals from other entities, and an output unit 1004 for providing signal(s) to other entities. The input unit and the output unit may be arranged as an integrated entity or as illustrated in the example of FIG. 8, as one or more interfaces 801.

Furthermore, the arrangement 1000 in the local node 800 comprises at least one computer program product 1008 in the form of a non-volatile memory, e.g. an EEPROM, a flash memory and a hard drive. The computer program product 1008 comprises a computer program 1010, which comprises code means, which when executed in the processing unit 1006 in the arrangement 1000 in the local node 800 operable in the communication network causes local node 800 to perform the actions e.g. of the procedure described earlier in conjunction with FIGS. 2a-2b.

The computer program 1010 may be configured as a computer program code structured in computer program modules 1010a-1010e. Hence, in an exemplifying embodiment, the code means in the computer program of the arrangement 1000 in the local node 800 comprises a receiving unit, or module, for receiving a local reporting policy from a master node in the communication network, the local reporting policy informing the local node of how to send a prediction to the master node. The computer program further comprises a building unit, or module, for building a local model based on locally available data; a performing unit, or module for performing a prediction based on the local model; and a transmitting unit, or module, for transmitting the prediction to the master node in accordance with the received local reporting policy, wherein the building of the local model, the performing of the prediction and the transmission of the prediction is based on the received local reporting policy from the master node.

The computer program modules could essentially perform the actions of the flow illustrated in FIGS. 2a-2b, to emulate the local node 800 operable in the communication network. In other words, when the different computer program modules are executed in the processing unit 1006, they may correspond to the units 803-806 of FIG. 8.

Although the code means in the respective embodiments disclosed above in conjunction with FIGS. 6 and 8 are implemented as computer program modules which when executed in the processing unit causes the master node and the local node to perform the respective actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the master node and the local node respectively.

It is to be understood that the choice of interacting units, as well as the naming of the units within this disclosure are only for exemplifying purpose, and nodes suitable to execute any of the embodiments of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a master node operable in a communication network for predicting one or more metrics associated with the communication network, the method comprising:

receiving prediction(s) based on training data from local nodes in the communication network;

determining weight parameter(s) associated with the local nodes based on the received prediction(s) and previously received prediction(s); and adjusting a respective local reporting policy specifying how one or more of the local nodes are to transmit the predictions to the master node, the adjusting being based on the determined weight parameter(s), wherein the adjusting of the respective local reporting policy further comprises deactivating a local node having a determined weight parameter not meeting a first threshold thereby causing the deactivated local node to stop sending predictions to the master node, wherein the adjusting of the respective local reporting policy further comprises changing a frequency with which a local node sends predictions to the master node depending on (i) a prediction accuracy of the prediction(s) received from the local nodes, and/or (ii) the determined weight parameter(s).

2. The method according to claim 1, wherein the adjusting of the respective local reporting policy comprises transmitting the respective reporting policy to the one or more of the local nodes to which the respective reporting policy is intended.

3. The method according to claim 1, further comprising determining a global model for predicting the one or more metrics associated with the communication network based on the prediction(s) received from the local nodes and the determined weight parameter(s).

4. The method according to claim 1, further comprising requesting a first set of predictions based on the training data from the local nodes in the communication network.

5. The method according to claim 1, wherein the adjusting of the respective local reporting policy comprises activating a previously deactivated node thereby causing the activated local node to start sending predictions to the master node.

6. The method according to claim 1, wherein the adjusting of the respective local reporting policy comprises changing a frequency with which a local node sends predictions to the master node depending on the determined weight parameter(s) of the activated local node.

7. The method according to claim 1, wherein the adjusting of the respective local reporting policy comprises turning off a sending of the predictions from a local node so that the local node just sends raw data.

8. A master node operable in a communication network for predicting one or more metrics associated with the communication network, the master node that includes a communication unit and a processor being configured for:

receiving prediction(s) based on training data from local nodes in the communication network;

determining weight parameter(s) associated with the local nodes based on the received prediction(s) and previously received predictions; and adjusting a respective local reporting policy specifying how one or more of the local nodes are to transmit the predictions to the master node, the adjusting being based on the determined weight parameter(s)

wherein the adjusting of the respective local reporting policy includes deactivating a local node having a determined weight parameter not meeting a first threshold, causing the deactivated local node to stop sending predictions to the master node, wherein the adjusting of the respective local reporting policy includes changing a frequency with which a local node sends predictions to the master node depending on (i) a prediction accuracy of the prediction(s) received from the local nodes, and/or (ii) the determined weight parameter(s).

9. The master node according to claim 8, wherein the adjusting of the respective local reporting policy includes transmitting the respective local reporting policy to the one or more of the local nodes to which the respective reporting policy is intended.

10. The master node according to claim 8, further being configured for determining a global model for predicting the one or more metrics associated with the communication network based on the prediction(s) received from the local nodes and the determined weight parameter(s).

11. The master node according to claim 8, further being configured for requesting a first set of predictions based on the training data from the local nodes in the communication network.

12. The master node according to claim 8, wherein the adjusting of the respective local reporting policy includes activating a previously deactivated node, causing the local node to start sending predictions to the master node.

13. The master node according to claim 8, wherein the adjusting of the respective local reporting policy includes changing a frequency with which a local node sends the predictions to the master node depending on the determined weight parameter(s) of the local node.

14. The master node according to claim 8, wherein the adjusting of the respective local reporting policy includes turning off a sending of the predictions from a local node so that the local node just sends raw data.

* * * * *